(12) United States Patent
Maruya et al.

(10) Patent No.: US 6,549,578 B1
(45) Date of Patent: Apr. 15, 2003

(54) MOVING PICTURE SYNTHESIZING DEVICE

(75) Inventors: Kensuke Maruya, Tokyo (JP); Shun Matsuura, Tokyo (JP); Hitoshi Kato, Oxford (GB)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/382,445

(22) Filed: Aug. 25, 1999

(30) Foreign Application Priority Data

Aug. 25, 1998 (JP) .......................................... 10-238312
Aug. 25, 1998 (JP) .......................................... 10-238313

(51) Int. Cl.[7] ................................................ H04B 1/66
(52) U.S. Cl. ................ 375/240.23; 382/233; 348/414.1
(58) Field of Search ....................... 375/240.01, 240.05, 375/240.14, 240.25, 240.23; 382/233; 348/385.1, 584, 466, 441, 414.1; 341/67, 82; 725/151

(56) References Cited

U.S. PATENT DOCUMENTS

| | | | | |
|---|---|---|---|---|
| 5,701,160 A | * | 12/1997 | Kimura et al. | 375/240.14 |
| 5,852,469 A | * | 12/1998 | Nagai et al. | 375/240.23 |
| 6,181,824 B1 | * | 1/2001 | Takizawa et al. | 382/233 |
| 6,252,990 B1 | * | 6/2001 | Senda | 382/233 |
| 6,341,177 B1 | * | 1/2002 | Takizawa et al. | 375/240.25 |

FOREIGN PATENT DOCUMENTS

| | | |
|---|---|---|
| JP | 6-78293 | 3/1994 |
| JP | 7-298263 | 11/1995 |
| JP | 8-214315 | 8/1996 |
| JP | 8-221579 | 8/1996 |
| JP | 9-18830 | 1/1997 |
| JP | 9-116866 | 5/1997 |
| JP | 10-210465 | 8/1998 |

* cited by examiner

*Primary Examiner*—Gims S. Philippe
(74) *Attorney, Agent, or Firm*—RatnerPrestia

(57) ABSTRACT

A moving picture synthesizing device includes a code string analyzer for analyzing the header information of moving picture code strings used for synthesis. A picture information generator is also included for generating header information of synthesized moving picture code string for describing the synthesized moving picture to be generated by using the analyzed result. In addition, a code string rewriting part is included for rewriting the display position information described in the moving picture code strings used for synthesis. Adequate header information corresponding to the synthesized moving picture is generated by a simple computation, and the moving picture code strings for describing the synthesized moving picture efficiently is generated without decoding the moving picture code strings used for synthesis.

35 Claims, 38 Drawing Sheets

Fig.7b

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | 708 1st Slice of Picture B1 | | | | | | 717 1st Slice of Picture B3 | | | | Non | Non | Non | Non |
| 2 | 709 2nd Slice of Picture B1 | | | | | | 718 2nd Slice of Picture B3 | | | | Non | Non | Non | Non |
| 3 | 710 3rd Slice of Picture B1 | | | | | | 719 3rd Slice of Picture B3 | | | | Non | Non | Non | Non |
| 4 | 711 4th Slice of Picture B1 | | | | | | 720 4th Slice of Picture B3 | | | | Non | Non | Non | Non |
| 5 | 712 5th Slice of Picture B1 | | | | | | 721 1st Slice of Picture B4 | | | | | | | |
| 6 | 713 6th Slice of Picture B1 | | | | | | 722 2nd Slice of Picture B4 | | | | | | | |
| 7 | 714 1st Slice of Picture B2 | | | | | Non | 723 3rd Slice of Picture B4 | | | | | | | |
| 8 | 715 2nd slice of picture B2 | | | | | Non | 724 4th Slice of Picture B4 | | | | | | | |
| 9 | 716 3rd slice of picture B2 | | | | | Non | 725 5th Slice of Picture B4 | | | | | | | |

Macroblock horizontal position 602

Macroblock vertical position 601

Non-display macroblocks 707

Fig.28
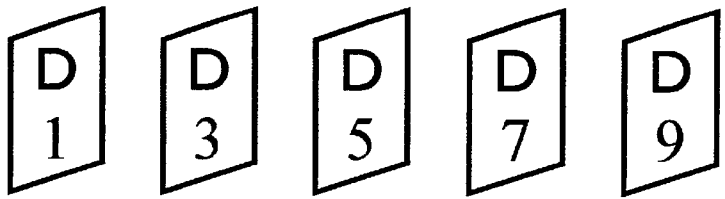
Interpolating-frame code string to be inserted 2801
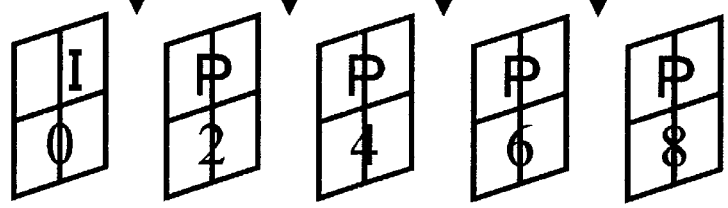
Synthesized picture code string before insertion of interpolating frame 2802
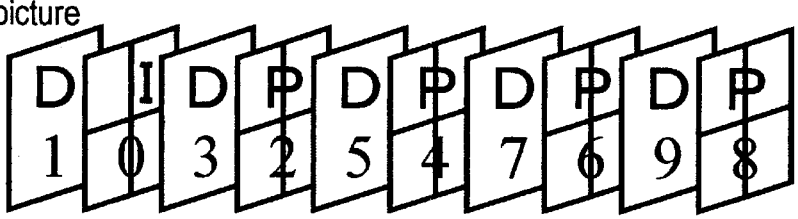
Synthesized moving picture code string 2609
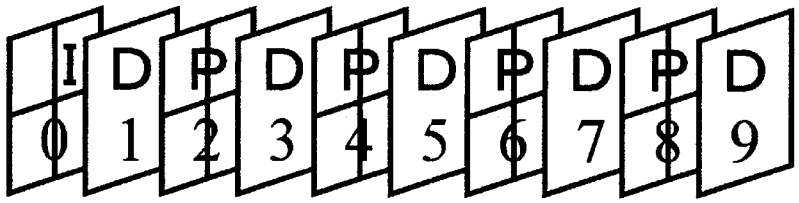
Display sequence 2803
Display content 2804
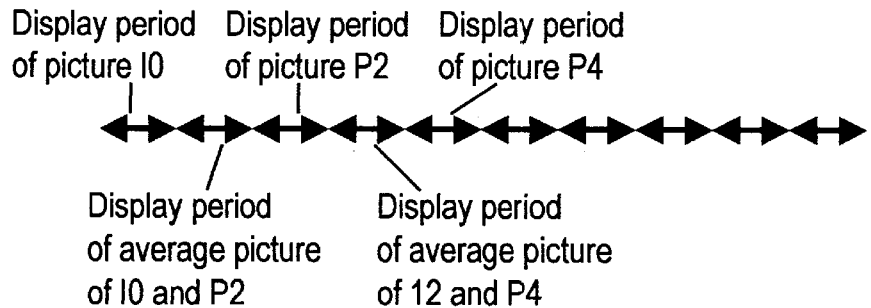

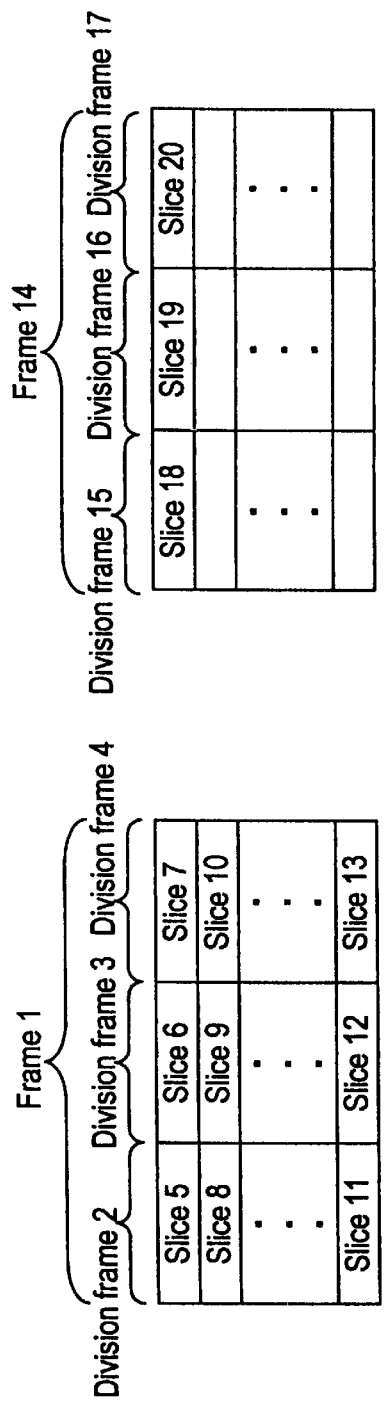
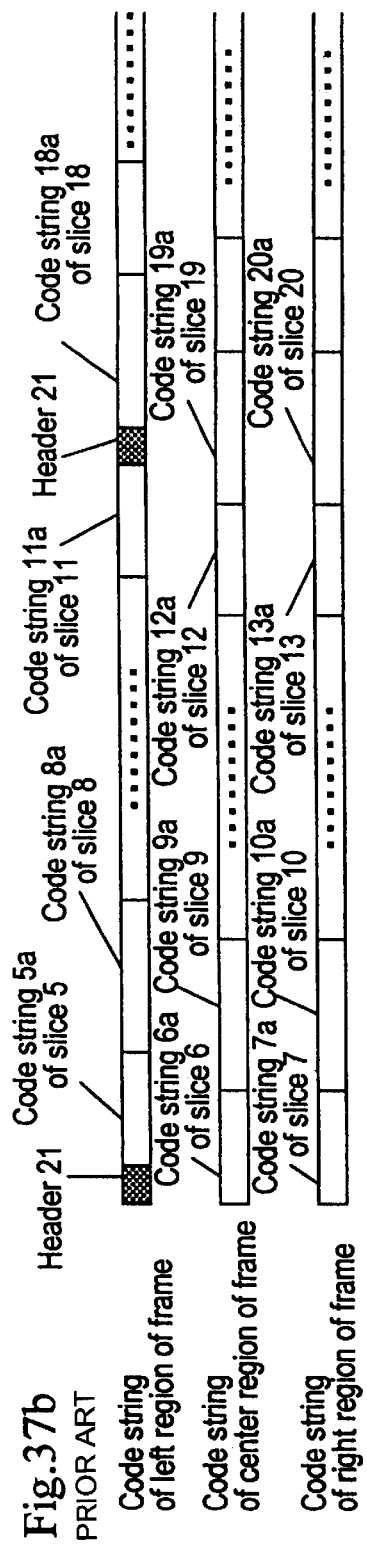
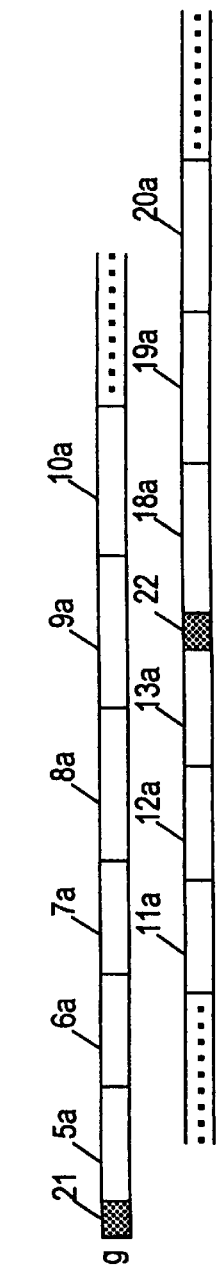
Fig.37a PRIOR ART
Fig.37b PRIOR ART
Fig.37c PRIOR ART

MOVING PICTURE SYNTHESIZING DEVICE

FIELD OF THE INVENTION

The present invention relates to a moving picture synthesizing device for synthesizing plural moving picture code strings, and obtaining a moving picture code string describing a synthesized moving picture composed by including moving pictures described by these plural moving picture-code strings.

BACKGROUND OF THE INVENTION

A conventional moving picture synthesizing device for synthesizing plural moving picture code strings, and obtaining a moving picture code string describing a synthesized moving picture composed by including moving pictures described by these plural moving picture code strings is described below.

FIG. 36 is a block diagram of an example of a conventional moving picture synthesizing device. This conventional device decodes coded strings 1, 2, 3, 4 of moving pictures into picture data 6, 7,8, 9 for one frame by a decoder 5, synthesizes into synthesized picture data 11 by a picture synthesizer 10. A coder 12 codes the synthesized picture data 11 with frame by frame, and generates a synthesized moving picture code string 13. This conventional device requires a tremendous amount of computation for decoding all moving picture code strings of the materials to be synthesized, synthesizing picture, and coding again the picture data of synthesized result.

Japanese Laid-open Patent Publication No. 7-298263 discloses a device for dividing an input moving picture into plural regions on a picture, synthesizing moving picture code strings obtained by coding in each divided region, and generating a moving picture code string describing the original moving picture. FIG. 37 is an explanatory diagram showing the synthesizing action for synthesized moving picture code string described original moving picture, disclosed in Japanese Laid-open Patent Publication No. 7-298263.

First as shown in FIG. 37a, this device divides continuous frames 1, 14 into three sections in the vertical direction in the picture region, and generates code strings as shown in FIG. 37b in each divided region. These code strings are linked on the boundary of frames and between frames in each slice. That is, in frame 1, code strings 5a, 6a,7a,8a are linked in this sequence, and a code string as shown in FIG. 37c is generated. The linked code string has the same syntax as in the case of coding without dividing the picture.

In this device, each frame picture of the original moving picture is divided into predetermined regions, and coded in each divided region, At this stage of coding, already, the linking sequence of code strings in each divided region is fixed. According to this fixed procedure, the code strings in each divided region are linked, and a code string for the entire original moving picture is generated. Therefore, it is not allowed to select plural arbitrary moving picture code strings, and obtain a code string corresponding to a synthesized moving picture composed by disposing the moving pictures described by these moving picture code strings at arbitrary positions.

Further, Japanese Laid-open Patent Publication No. 10-210465 discloses a device for generating a moving picture code string for describing a synthesized moving picture composed by including the moving pictures described by each code string, from plural moving picture code strings. This device changes over use or non-use of a picture header included in each one of plural moving picture code strings, and replaces or deletes a slice header included in each one of the plural moving picture code strings. And this device links the plural code strings into a synthesized moving picture code string.

This device does not comprise any means for generating various header information for entire synthesized moving picture. So, this device does not regenerate a information about picture size, picture rate, aspect ratio, bit rate, video buffering verifier buffer size, motion vector processing precision, motion vector description range, picture coding type, and others. And hence the obtained "moving picture code string for describing the synthesized moving picture" may not be decoded correctly.

SUMMARY OF THE INVENTION

The moving picture synthesizing device of the invention is to synthesize plural moving picture code strings, and obtain a moving picture code string for describing a synthesized moving picture what includes moving pictures described by these plural moving picture code strings disposed in an arbitrary configuration on a picture. In particular, it is intended to describe the synthesized moving picture correctly in by the picture headers and slice headers included in the obtain ed synthesized moving picture code string.

To realize this, the moving picture synthesizing device of the invention comprises code string analyzer for analyzing the header information of moving picture code strings used for synthesis, picture information generator for generating header information of synthesized moving picture code string for describing the synthesized moving picture to be generated by using the analyzed result, and code string rewriting part for rewriting the display position information described in the moving picture code strings used for synthesis. Adequate header information corresponding to the synthesized moving picture is generated by a simple computation, and the moving picture code strings for describing the synthesized moving picture efficiently is generated without decoding the moving picture code strings used for synthesis.

In other aspect of the invention, the moving picture synthesizing device can process easily and at high speed when obtaining synthesized moving picture code string describing the synthesized moving picture and consisting of a mixture of different frame types such as intra-frame and predictive frame, without deteriorating the picture quality of the original moving picture, without complicating the constitution of the computer, or without using expensive or high performance device.

To realize this, the moving picture synthesizing device in this aspect of the invention includes picture coder. The picture coder generates and issues moving picture code strings for synthesis consisting of a mixture of multiple frame types such as intra-frame and predictive frame when compressing and coding input video signal. At this time, the picture coder processes all moving picture code strings for synthesis to be issued so that the occurrence pattern of frame types may be always the same. This device reads in the input of plural moving picture code strings for synthesis so that the occurrence pattern of frame types may be all the same, synthesizes in the frame unit, and issues the synthesized moving picture code string similarly in the same pattern.

The picture coder generates a GOP (group of pictures), and processes at this time so that the occurrence pattern may be same in each GOP, concerning the frame types of each frame in the GOP, and that the number of frames included in the GOP may be a fixed number. As a result, by sorting the moving picture code strings for synthesis at random in GOP unit, and the picture can be synthesized by using the moving picture code strings after sorting.

In a different aspect of the invention, the moving picture synthesizing device processes the input of video signal by decimating between frames in a specific frame period, feeds the decimated video signal into picture coder. And, this device generates and inserts frame picture code strings describing the same frame picture as either preceding or succeeding frame picture, or an intermediate frame picture of preceding and succeeding frames, into synthesized moving picture code string what is synthesized from the moving picture code strings coded after decimation, so that a playing speed of moving picture described by the inserted picture code string may be equal to the time axis playing speed of the video signal before decimation. As a result, the number of frames per unit time is smaller than in the original input video signal, and the picture coding process and picture synthesizing process per unit time may be curtailed, and the bit rate can be lowered. Furthermore, the storage capacity of the moving picture code strings for synthesis may be reduced when storing in storage.

In a further aspect of the invention, the moving picture synthesizing device includes video division setting part for setting video division frame positions, by detecting the division frame positions as the divisions of input video signal either automatically or manually, and the frames included in the video division are adjusted by inserting dummy frames or decimating frames, so that the number of frames in the video division may be a multiple of a fixed number of frames included in the GOP, thereby synthesizing randomly in the video division unit.

In other different aspect of the invention, the moving picture synthesizing device includes frame selector for picking up frame-picture code strings having a specific frame type, from the GOP of each moving picture string for synthesis to be synthesized, and the synthesized frame code string is generated only from the frame code strings of the specific frame type.

It hence requires only the process of synthesizing the frame code strings belonging to the specific frame type (for example, intra-frames only), so that the load of synthesizing process is alleviated, while the efficiency is enhanced.

In a further different aspect of the invention, the moving picture synthesizing device has the picture coder which is constituted so as to divide, compress, and code a picture of the divided region in the frame picture of the input video signal, in the unit of DCT block, macroblock, or GOB (group of blocks), and, within the moving picture code strings for synthesis to be synthesized, the frame data of intra-frames are converted into frame data of predictive frames in the unit of the picture regions. At this time, when compressing and coding the data in the divided region by the picture coder, the type of motion prediction (forward prediction, backward prediction, etc.) and block type such as intra code or not are given and issued as attributes in each picure region. At the time of synthesis, each block type of the moving picture code strings for synthesis is judged, and properly converted or processed.

As a result, even from any arbitrary frame position other than the GOP unit, it is possible to synthesize by minimizing the picture quality deterioration by decoding. Moreover, when converting the frame type, conversion can be controlled in the block unit, and useless conversion process can be avoided. It is also possible to synthesize in the block unit. Still more, since the individual frame types can be converted, if the frame patterns of the video signal being taken in are random, it is possible to obtain synthesized picture code strings flexibly without being restricted.

In another different aspect of the invention, the moving picture synthesizing device generates and inserts frame picture code strings describing the same frame picture as either preceding or succeeding frame picture, or an intermediate frame picture of preceding and succeeding frames, individually, into moving picture code strings for synthesis. As a result, in each picture region of the frame picture of the synthesized moving picture describing the synthesized moving picture code strings, it is possible to generate synthesized moving picture code strings describing the synthesized pictures presented at different reproduction speeds, in the portion corresponding to the moving picture code strings for synthesis in which the frame picture code string is inserted, and in the portion corresponding to the moving picture code strings for synthesis in which nothing is inserted.

BRIEF DESCRIPTION OF THE DRAWINGS

FIG. 28 is an explanatory diagram showing frame composition of moving picture code strings issued by synthesized picture output part of the moving picture synthesizing device in the eighth embodiment of the invention.

FIG. 37 is an explanatory diagram showing the "synthesizing motion of synthesized moving picture code strings" disclosed in Japanese Laid-open Patent Publication No. 7-298263.

DESCRIPTION OF THE PREFERRED EMBODIMENTS

First Embodiment

A moving picture synthesizing device in a first embodiment of the invention is described below while referring to FIG. 1 through FIG. 9. The moving picture synthesizing device of the embodiment is to synthesize plural moving picture code strings, and obtain moving picture code string describing the synthesized moving picture included the moving pictures described by these plural moving picture code strings disposed in an arbitrary configuration on a picture.

Figure 1:
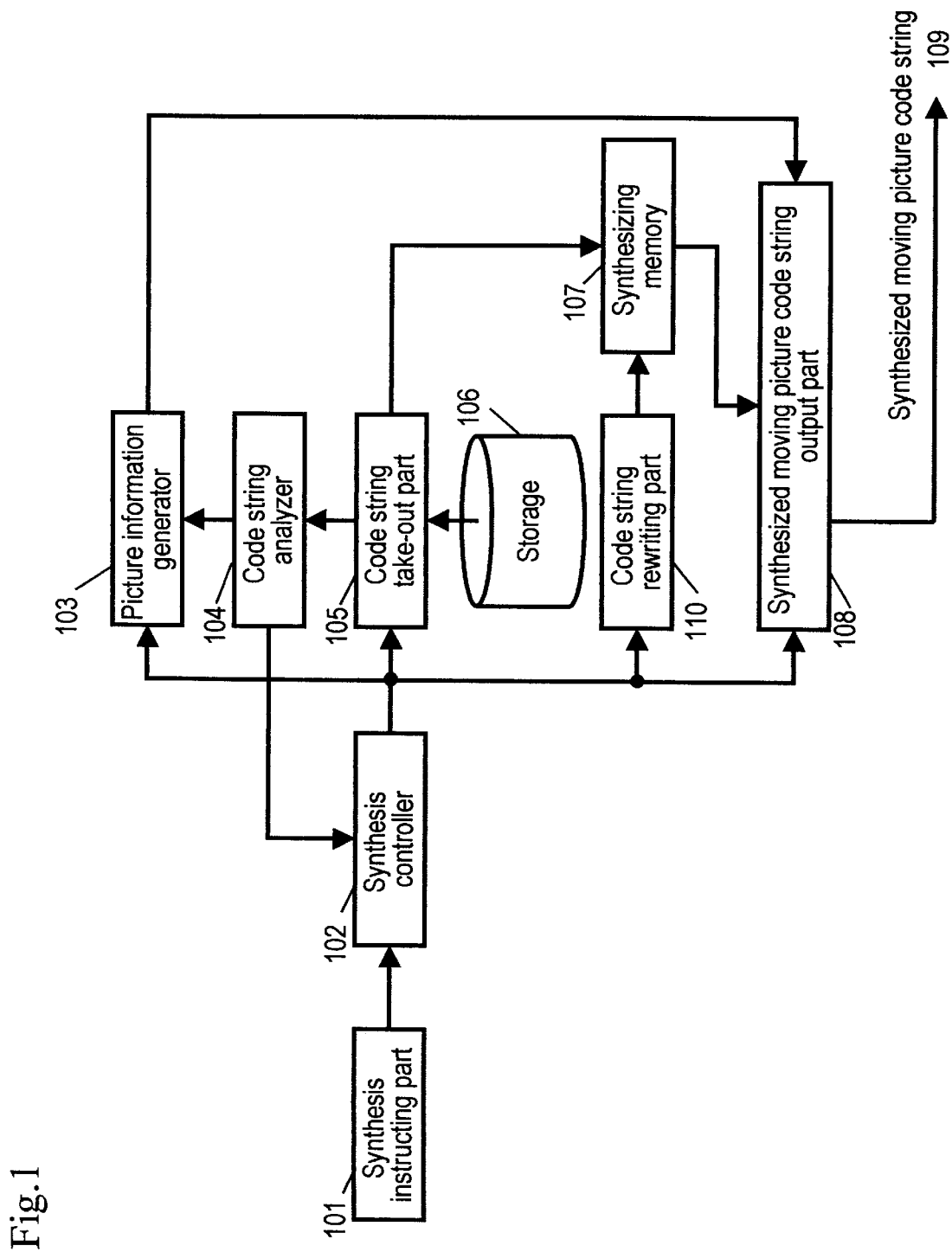
FIG. 1 is a block diagram showing a constitution of a moving picture synthesizing device in a first embodiment of the invention.

FIG. 1 is a block diagram showing the moving picture synthesizing device in the first embodiment. In FIG. 1, storage 106 accumulates and controls plural moving picture code strings used for synthesis by this device. The storage 106 may be realized by various storing devices using storing media, such as magnetic disk, optical disk, magneto-optical disk, magnetic tape or semiconductor memory. Of course, read-only medium in which moving picture code strings are written preliminarily may be also used.

Synthesis instructing part 101 selects and instructs moving picture code strings for use in synthesis, and instructs the configuration of moving pictures described individually by the selected moving picture code strings. Synthesis controller 102 controls picture information generator 103, code string take-out part 105, code string rewriting part 110, and synthesized picture code string output part 108 according to the instruction of the synthesis instructing part 101, and synthesizes the moving picture code string corresponding to the synthesized moving picture.

The code string take-out part 105 takes out the instructed moving picture code strings from the storage 106, and temporarily stores the taken-out moving picture code string into a synthesizing memory 107. The code string analyzer 104 analyzes the header information of the moving picture code string taken out by the code string take-out part 105. The picture information generator 103 refers to the analysis result of the code string analyzer 104, and generates header information of synthesized moving picture code string. The code string rewriting part 110 rewrite the display position information of the moving picture code string stored in the synthesizing memory 107. The synthesized picture code string output part 108 sequentially links the moving picture code strings rewritten in the display position information, and issues the synthesized moving picture code string 109, together with the generated header information of synthesized moving picture code string.

Figure 2:
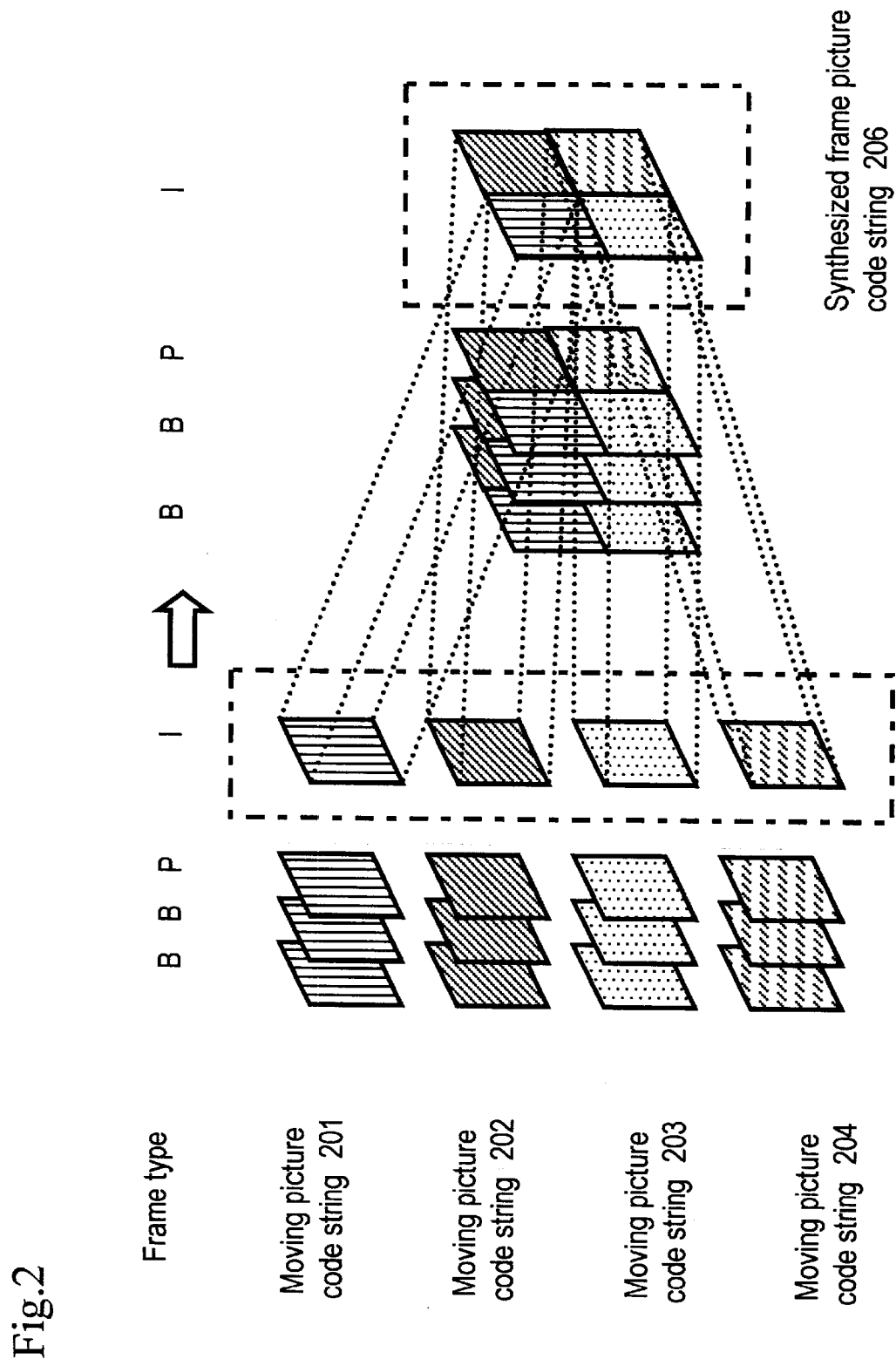
FIG. 2 is an explanatory diagram showing the motion of picture synthesis in the moving picture synthesizing device in the first embodiment of the invention.

That is, the moving picture synthesizing device of the embodiment synthesizes, as shown in FIG. 2, one large synthesized frame picture code string 205 by sequentially taking out code strings same in the frame type from the plural moving picture code strings 201, 202, 203, 204 stored in the storage 106.

Figure 3:
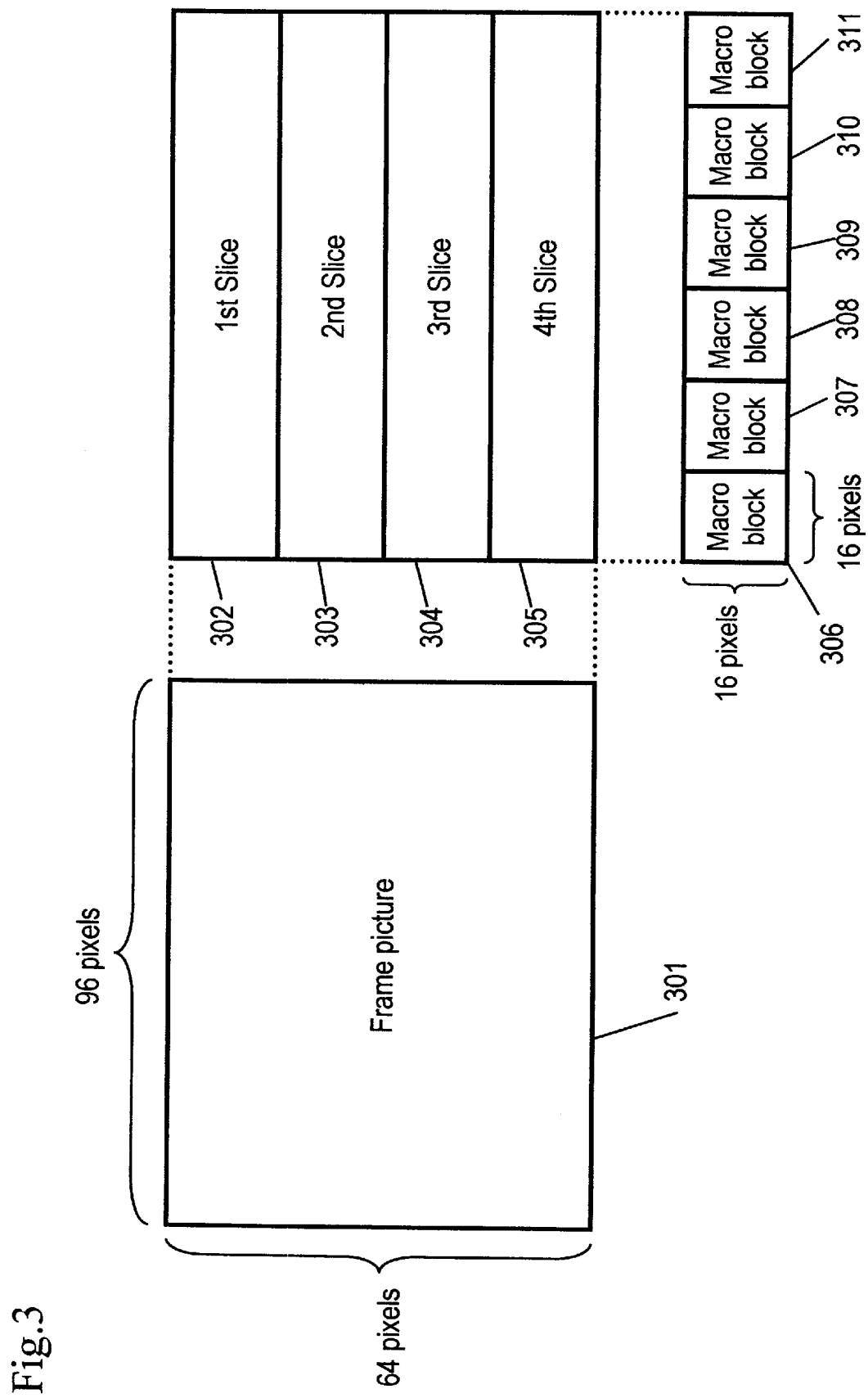
FIG. 3 is an explanatory diagram showing the coding format of moving picture code strings used in synthesis in the moving picture synthesizing device in the first embodiment of the invention.

As shown in FIG. 3, the moving picture code strings 201, 202, 203, 204 are MPEG code strings formed by dividing each frame picture of the original moving picture into regions of macroblocks, compressing and coding in macroblock units, and linking macroblocks in one lateral string into one slice. This is an example of a moving picture consisting of lateral 96 pixels×vertical 64 pixels, and 16 pixels×16 pixels are formed as one macroblock, and six macroblocks 306 to 311 in one lateral string in the frame upper stage compose a first slice 302. Similarly, second slice, third slice, and fourth slice are composed.

Figure 4:
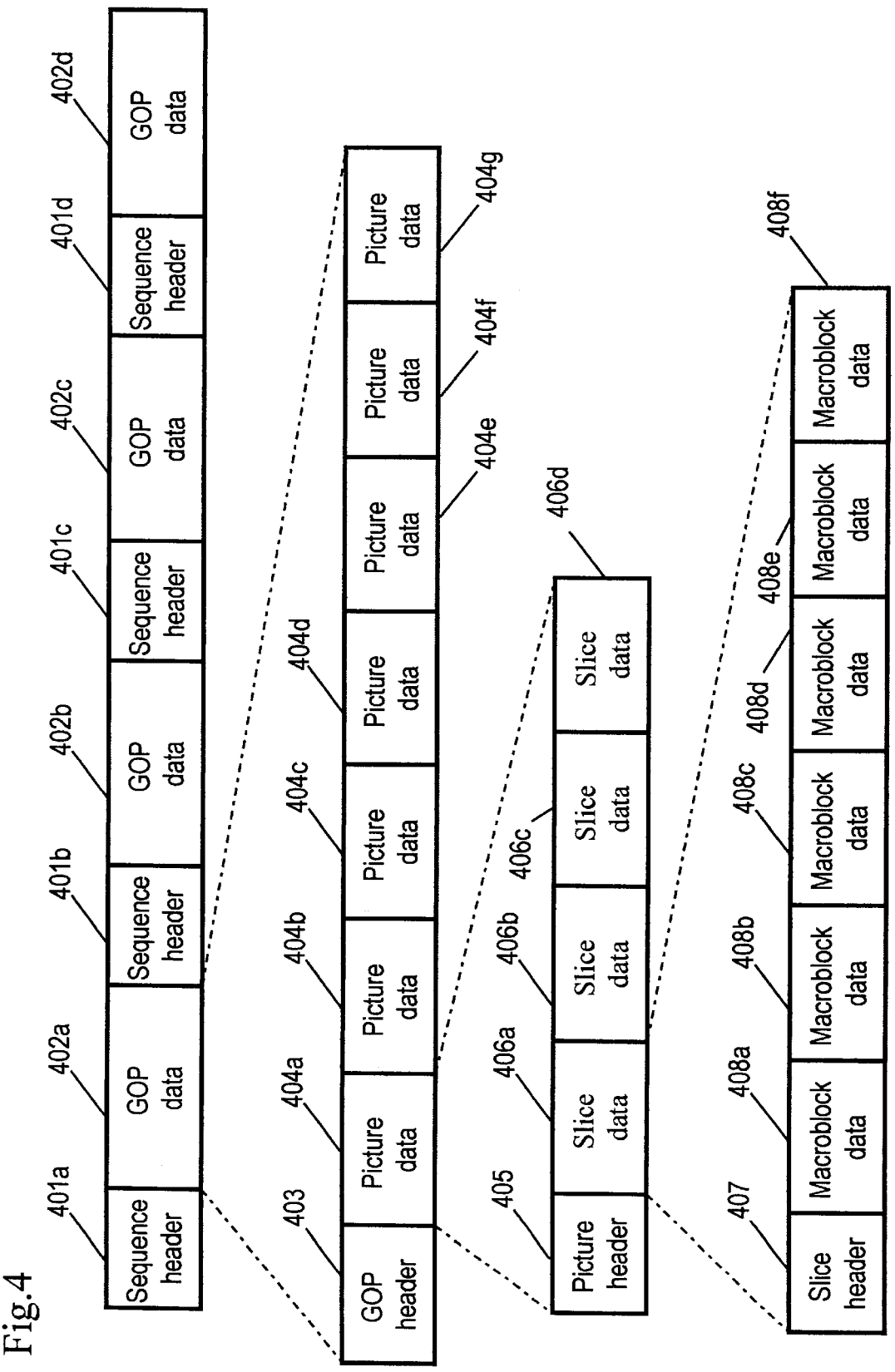
FIG. 4 is an explanatory diagram showing the constitution of moving picture code strings used in synthesis in the moving picture synthesizing device in the first embodiment of the invention.

As shown in FIG. 4, in the composition of the MPEG code string of this moving picture, the slice header is followed by six pieces of macroblock data.

The synthesis instructing part 101 presents an interface for specifying to dispose the moving pictures described by the moving picture code strings stored in the storage 106 at which position on the synthesized picture. For example, the region occupied by each picture on the synthesized picture is specified in the GUI. The display position of each moving picture on the synthesized picture can be arranged at an arbitrary position in the unit of macroblock (16×16 pixels). The synthesis instructing part 101 divides the synthesized picture in macroblock units, and creates a correspondence table of each macroblock on the synthesized picture and the slice of the disposed moving picture code strings.

Figure 5:
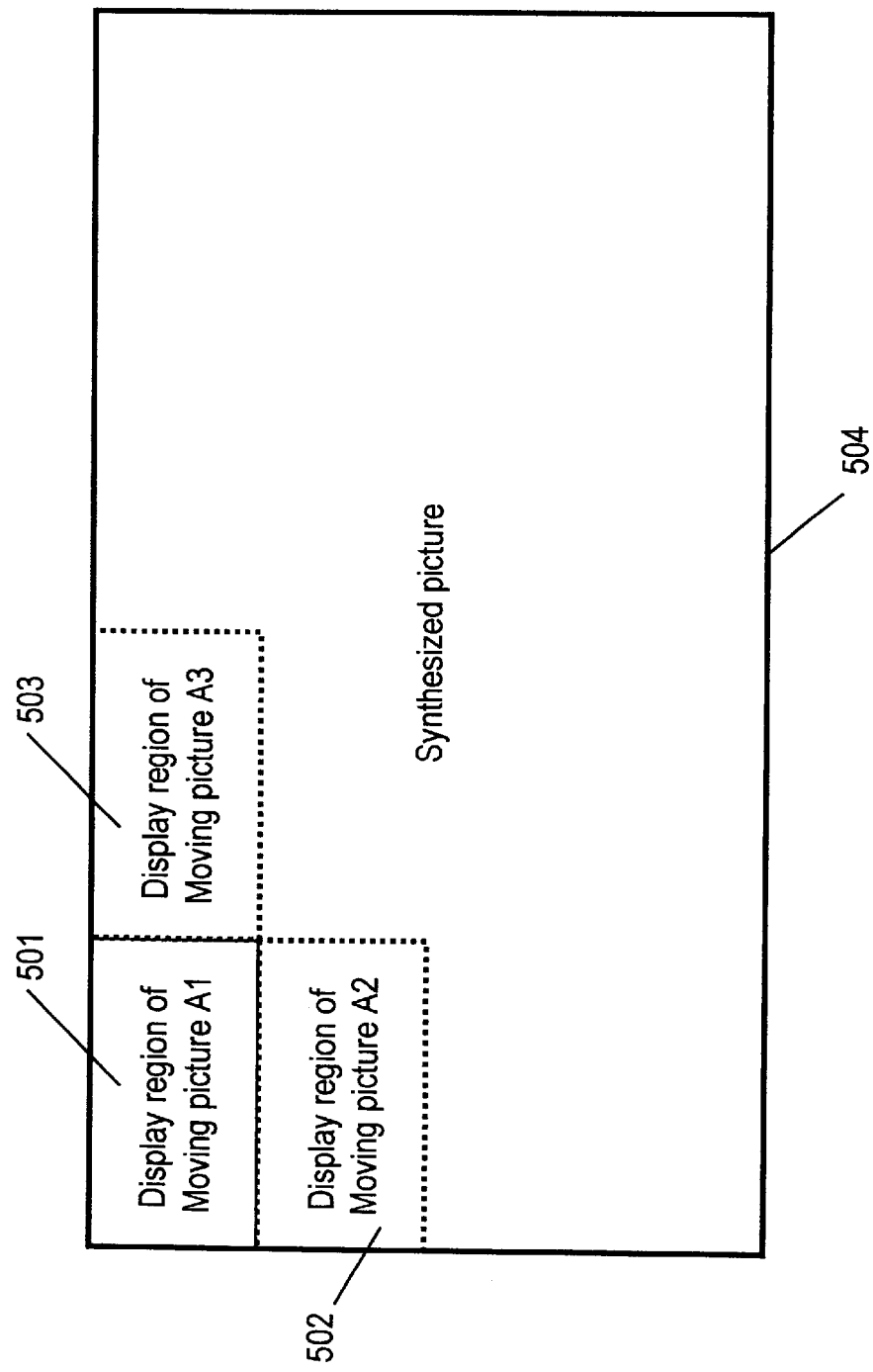
FIG. 5 is an explanatory diagram showing an example of synthesis instruction in synthesis instructing part of the moving picture synthesizing device in the first embodiment of the invention.
Figure 6:
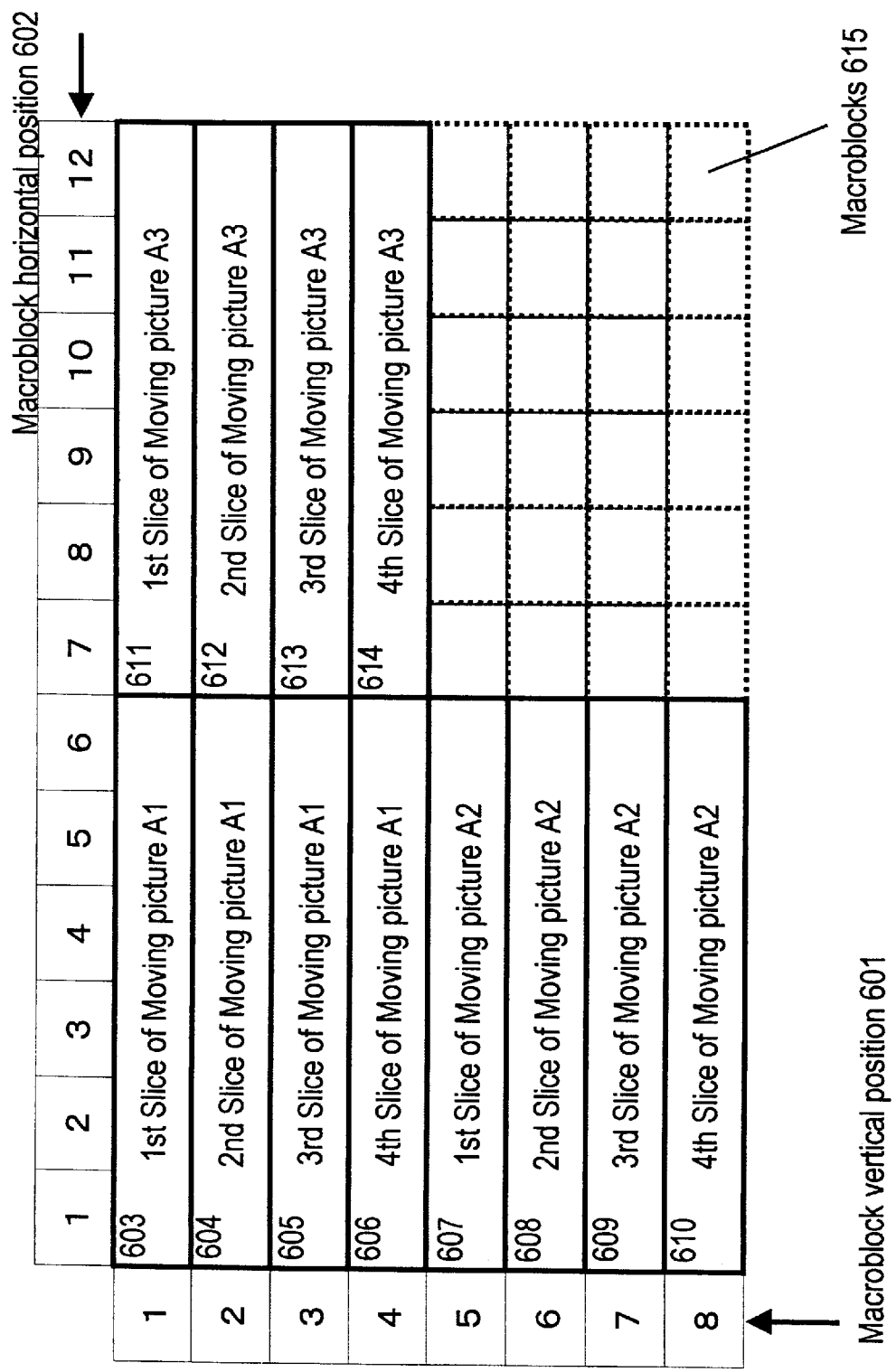
FIG. 6 is a correspondence table of macroblock and slice of an example generated by the synthesis instructing part of the moving picture synthesizing device in the first embodiment of the invention.

For example, as shown in FIG. 5, when display region 501, 502, 503 of moving pictures A1 to A3 are disposed on the synthesized picture 504, the correspondence table of macroblock and slice is as shown in FIG. 6. The first slice 603 of the moving picture A1 is disposed at the macroblock position of coordinates (1, 1) on the synthesized picture, and the first slice 611 of the moving picture A3 is disposed at the macroblock position of coordinates (7, 1) on the synthesized picture.

Figure 7A:
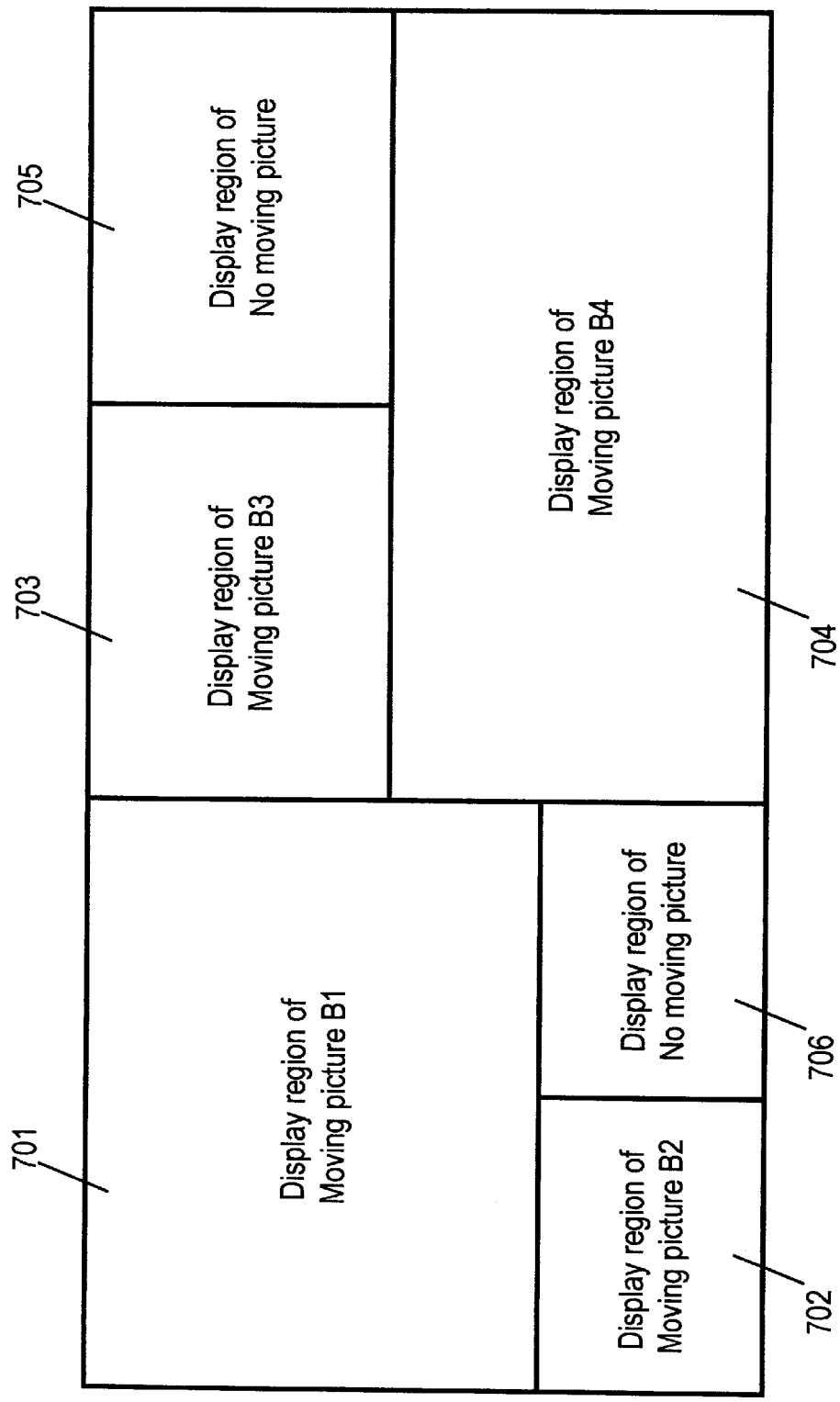
FIG. 7 is a correspondence table of macroblock and slice of other example generated by the synthesis instructing part of the moving picture synthesizing device in the first embodiment of the invention.

It is not required that the size of the moving pictures used in synthesis should be uniform, or that moving pictures are disposed in all macroblock regions on the synthesized picture. For example, as shown in FIG. 7a, display region 701, 702, 703, 704 of moving picture B1 to B4 of different sizes may be disposed, and there may be regions 705, 706 not having moving picture on the synthesized picture. In this case, in the macroblock in which moving picture is not disposed, a correspondence table of macroblock and slice as shown in FIG. 7b with marking for distinguishing "no moving picture" is created. In this example, the marking of "no picture" is indicated by "Non" in the macroblocks at coordinates (1, 11) to (1, 14), (2, 11) to (2, 14), (3, 11) to (3, 14), (4, 11) to (4, 14), coordinates (7, 4) to (7, 6), (8, 4) to (8, 6), and coordinates (9, 4) to (9, 6).

Figure 8:
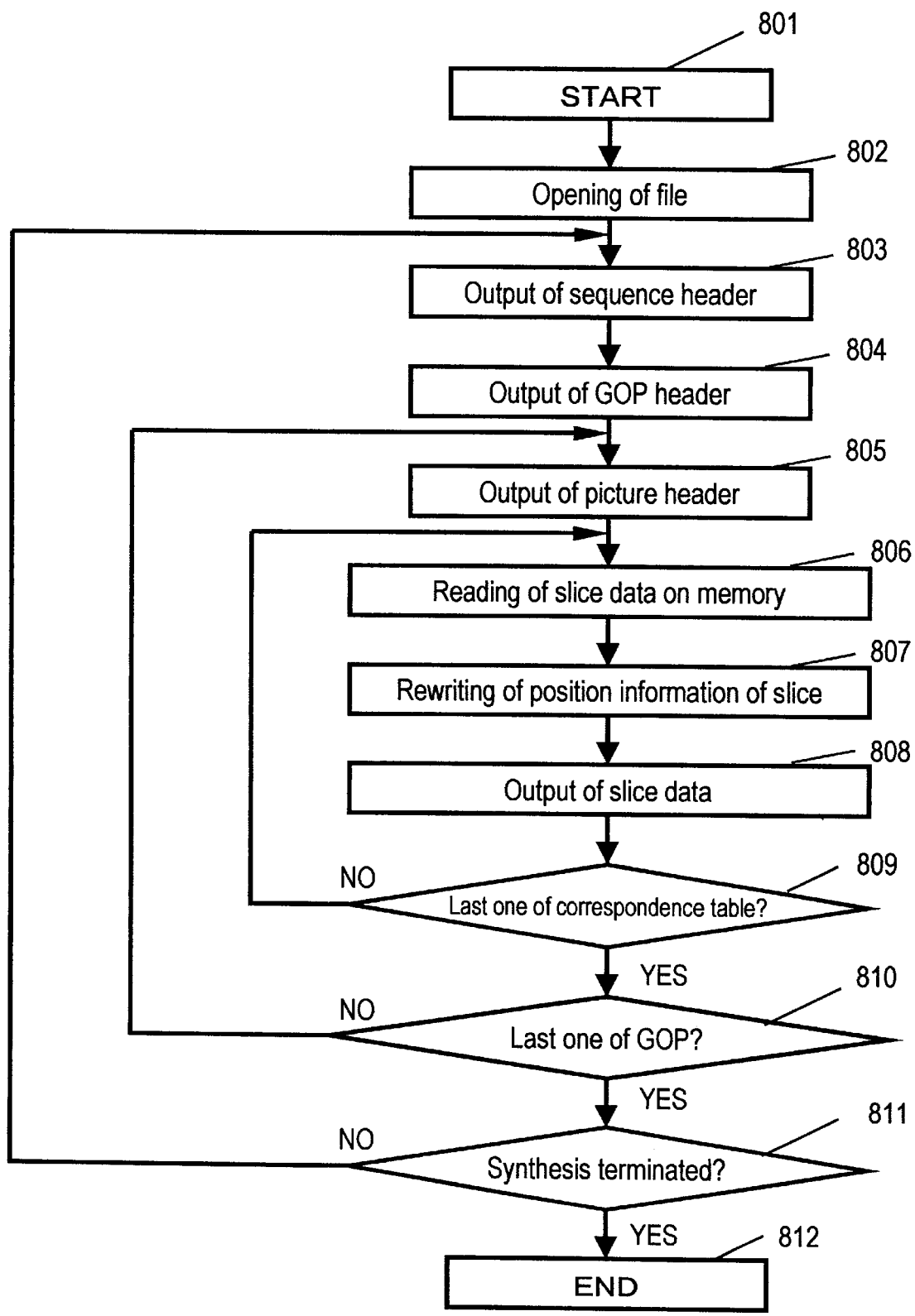
FIG. 8 is a flowchart showing the motion of synthesis controller of the moving picture synthesizing device in the first embodiment of the invention.

The synthesis controller 102 controls the synthesis process conforming to the flowchart shown in FIG. 8. Each step is described below.

Step 801:

When receiving the correspondence table of macroblock and slice of the synthesized picture shown in FIG. 6 or FIG. 7b from the synthesis instructing part 101, control of synthesis process is started.

Step 802:

First, opening of moving picture code string file included in the correspondence table of macroblock and slice is instructed to the code string take-out part 105. The code string take-out part 105 transfers the beginning portion of the moving picture code string from the storage 106 to the code string analyzer 104. The code string analyzer 104 analyzes the header information of each moving picture code string. The analyzer 104 notices to the synthesis controller 102, if coded in a different condition from other moving picture code string or if moving picture code string is not present. And the analyzer 104 corrects the correspondence table of macroblock and slice so that moving picture may not be issued to the macro block in which the slice of the corresponding reduction moving picture is disposed.

Steps 803 to 805:

Next, the sequence header, GOP header and picture header of synthesized moving picture code string are generated. The values commonly used in the entire synthesized moving picture code string such as picture rate are set in each moving picture code string, these values are utilized.

The picture size and aspect ratio are generated according to the contents specified by the synthesis instructing part 101 by reference to the values described in each moving picture code string.

As for the values different in each moving picture code string used for synthesis such as bit rate and video buffering verifier buffer size, the header information of each moving picture code string is acquired from the code string analyzer 104, and the value after synthesis is calculated.

For example, the bit rate is the value adding the bit rates of all reduced moving pictures. The picture header generates a different value in each frame to be processed. The precision of motion vector, range and type of picture make use of the values used in each picture to be synthesized. However, most values that can be changed in each frame as the MPEG standard of precision of motion vector, description range or the like are often coded as fixed values in the entire moving picture, and therefore by investigating the fixed value beforehand, and using the fixed value, high speed processing is realized. The picture display sequence and picture type are determined from the GOP composition of the moving picture code string.

Figure 9:
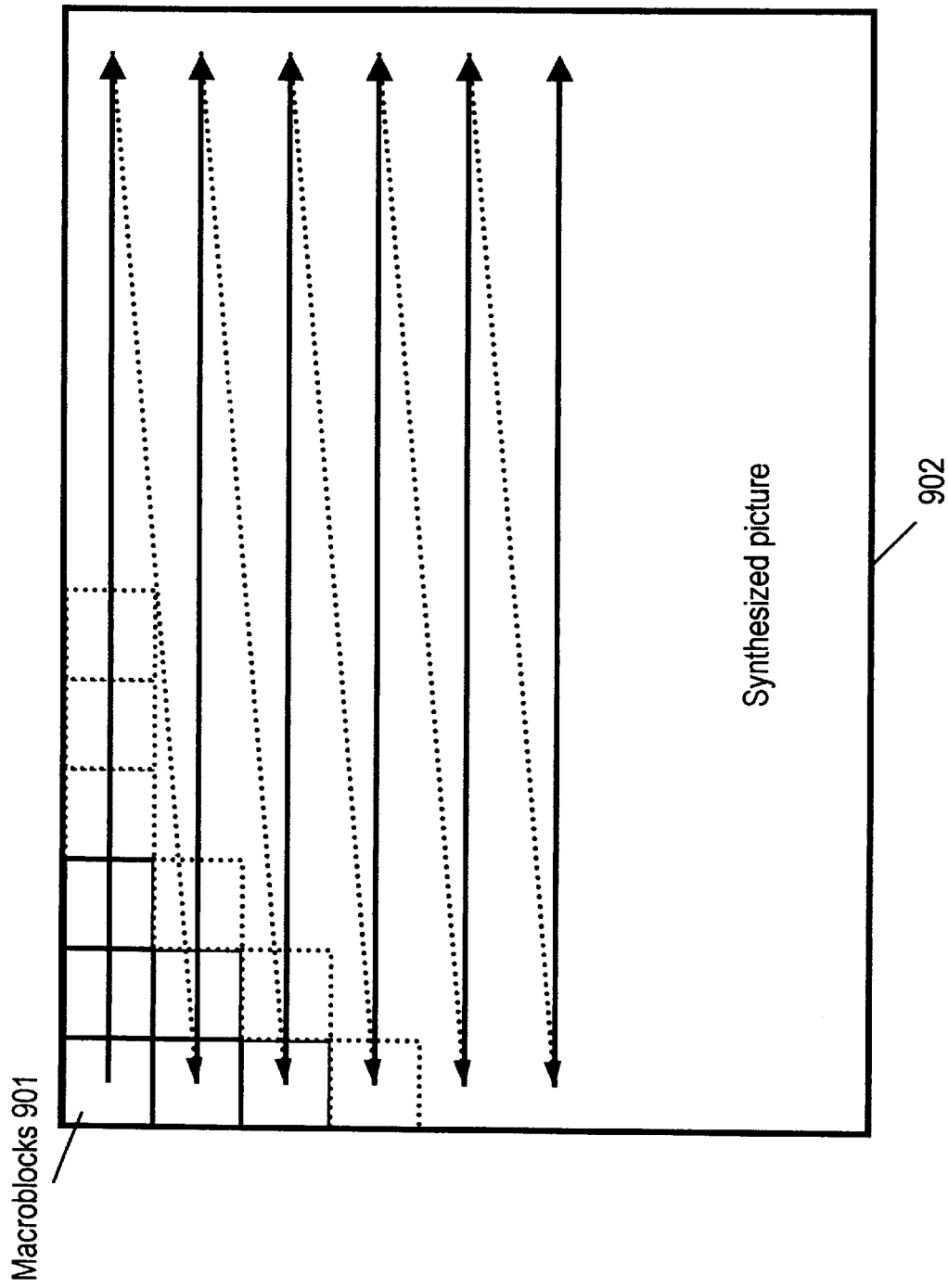
FIG. 9 is a flowchart of slice data synthesis process motion of the synthesis controller of the moving picture synthesizing device in the first embodiment of the invention.

Consequently, the synthesis of slice data is controlled. The synthesis controller 102 processes the correspondence table of the macroblock and slice of the synthesized picture shown in FIG. 6 or FIG. 7b, in the raster scan sequence as shown in FIG. 9. That is:

Step 806:

If there is slice data to be synthesized in the macroblock being processed, first, it is instructed to the code string take-out part 105 to read out the slice data disposed on the macroblock being processed on the synthesis memory 107.

Step 807:

At the beginning of the slice data, there is a slice header, and Slice Start Code is described therein, and it is instructed to the code string rewriting part 110 to correct this value to the code showing the vertical position of the slice after synthesis.

It is instructed to the code string rewriting part 110 so as to correct Macroblock Escape and Macroblock Address Increment in the macroblock data in the beginning macroblock of the slice data to the codes indicating the horizontal position of the beginning macroblock of the slice after synthesis.

Step 808:

After correcting these values, slice data is issued from the synthesis memory 107. When issuing a blank to the correspondence table of macroblock and slice, slice data showing the blank corresponding to the frame type being processed is issued. The slice data showing the blank is the slice data displaying a black picture, and an encoded black picture is used as the I frame, and slice data of forward direction predictive frames of motion prediction 0 are used as the P frame and B frame.

Step 809:

Until reaching the lower right corner of a synthesized picture 902 shown in FIG. 9, looping to step 806, each slice is processed sequentially. When reaching the upper right corner of the synthesized picture 902 shown in FIG. 9, the synthesis operation of one frame is terminated.

Steps 810 to 812:

When the synthesis process of one frame is terminated, processing of next frame is started, but when the next frame is the beginning frame of GOP, the sequence header and GOP header are issued in the above method. When reaching the predetermined end condition, the operation is terminated. The end condition is set by selecting from the case of termination of any one of reduced moving pictures, the case of termination of all reduced pictures, the presetting of the total number of frames to be synthesized, etc. When reaching the final frame, the end code of the sequence is issued, and the synthesis is terminated.

Thus, according to the embodiment, when generating moving picture code string describing the synthesized moving picture disposing moving pictures described by plural moving picture code strings at an arbitrary position on the synthesized picture, by linking the slices while generating the header information of the synthesized moving picture code string by making use of the header information of the plural moving picture code strings, it brings about an effect of generating a synthesized moving picture free from contradiction as the MPEG code string efficiently.

Second Embodiment

Figure 10:
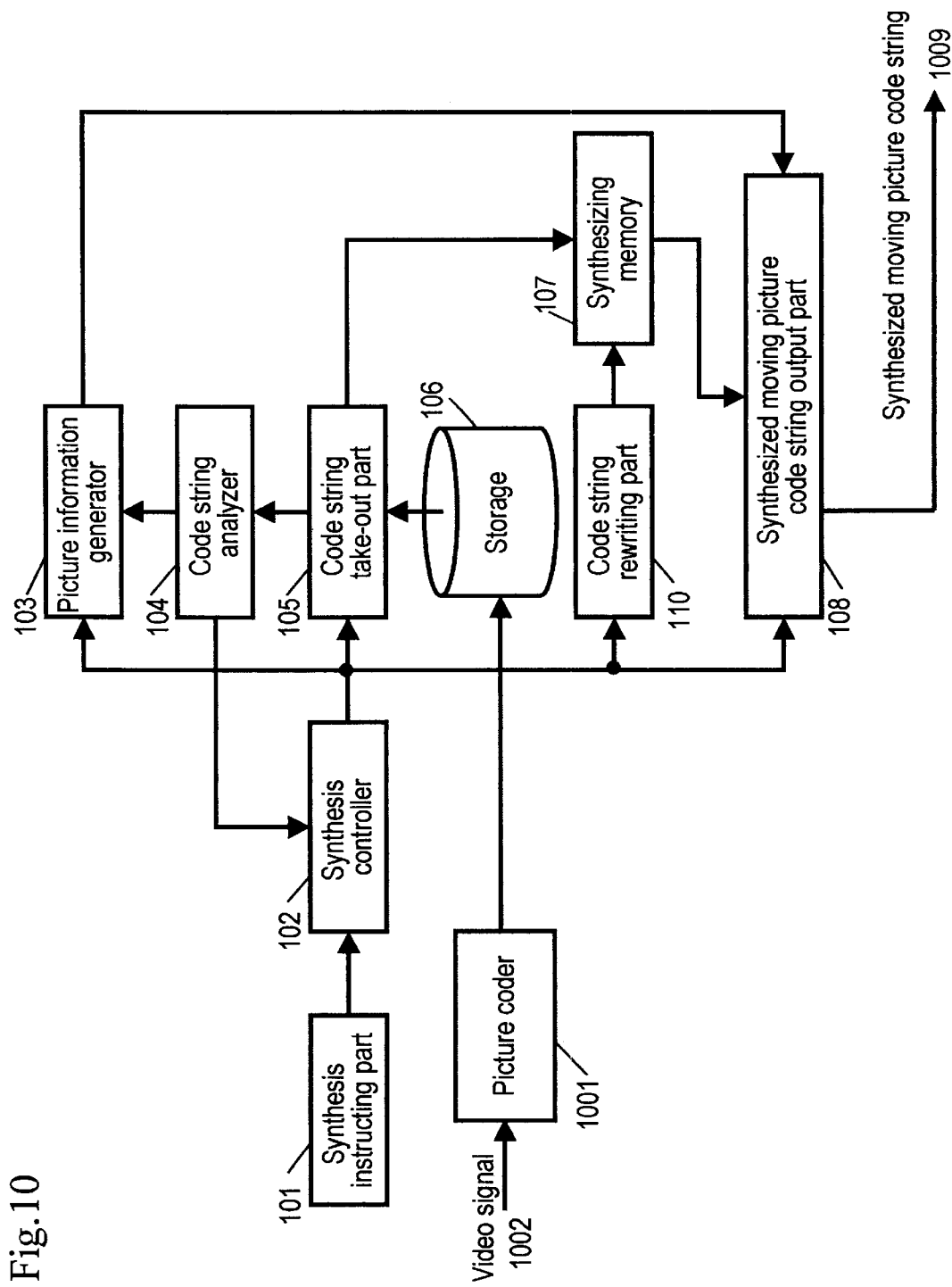
FIG. 10 is a block diagram showing a constitution of a moving picture synthesizing device in a second embodiment of the invention.

A moving picture synthesizing device in a second embodiment of the invention is described below. FIG. 10 is a block diagram of the embodiment. In this embodiment, in addition to the constitution of the moving picture synthesizing device of the first embodiment, there is moving picture coder 1001 for entering the moving picture code strings as materials for synthesis into the storage 106.

In this embodiment, the storage 106 is an storing device using a writable storing medium.

The picture coder 1001 compresses and codes the video signal 1002 as the materials for synthesis entered from outside in frame units. At this time, by compressing within frame and compressing between frames, moving picture code strings for synthesis mixing various frame types such as intra-frame and predictive frame are generated and issued. At this time, the picture coder 1001 compresses and codes the video signal 1002 so that the frame type patterns may be always the same.

Figure 11:
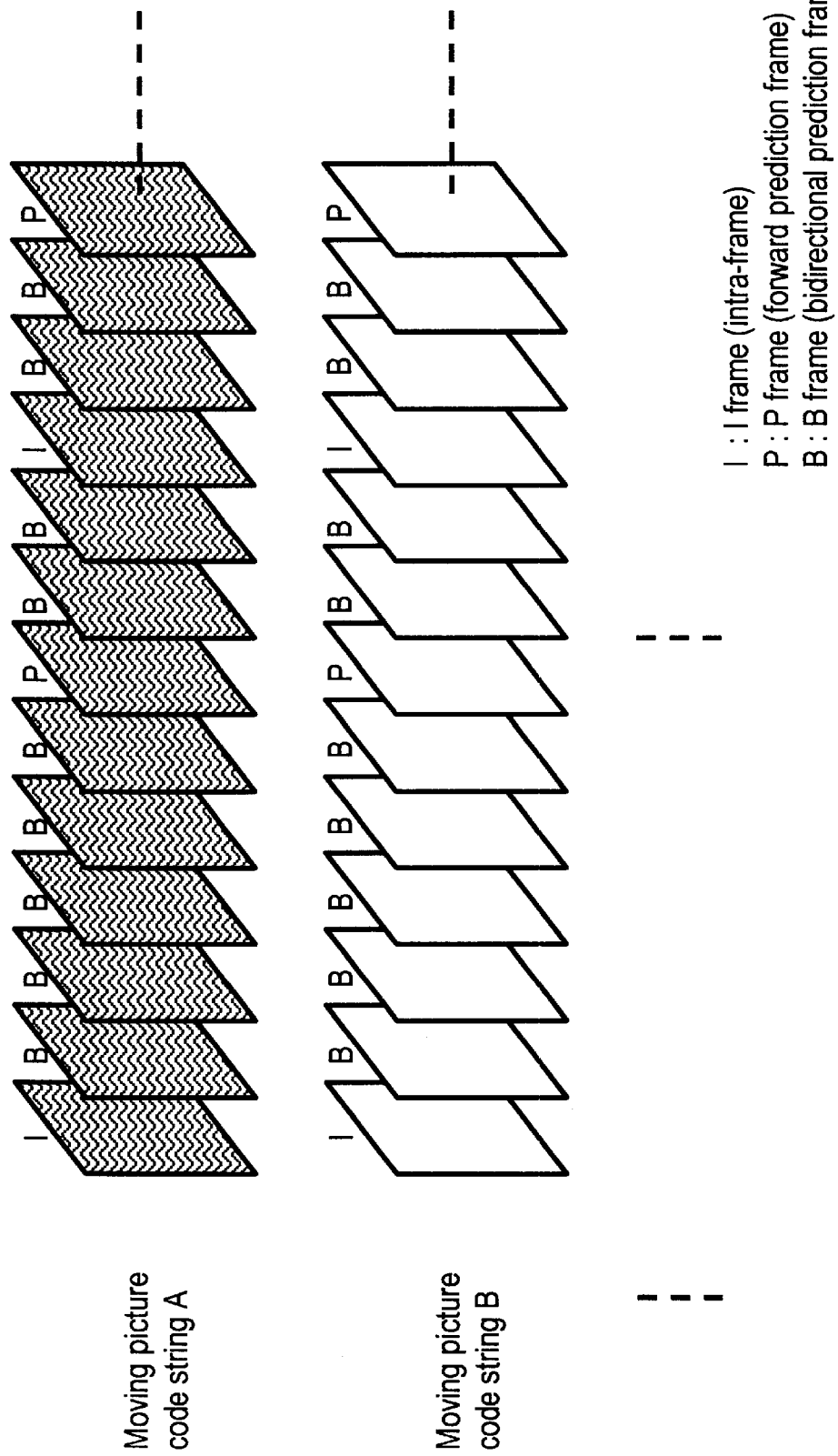
FIG. 11 is an explanatory diagram showing an example of frame type pattern of moving picture code strings for synthesis in the second embodiment of the invention.

An example of using MPEG-1 as compressing and coding format is shown in FIG. 11. FIG. 11 shows that the frame type patterns of all moving picture code strings are

IBBPBBBPBBIBBPBBPBBPBB . . .

The video signal 1002 as the picture material for synthesis is compressed and coded by the picture coder 1001, and stored in the storage 106 as the moving picture code string. The storage 106 can store plural moving picture code strings, and each moving picture code string is controlled by using one identifier.

Figure 12:
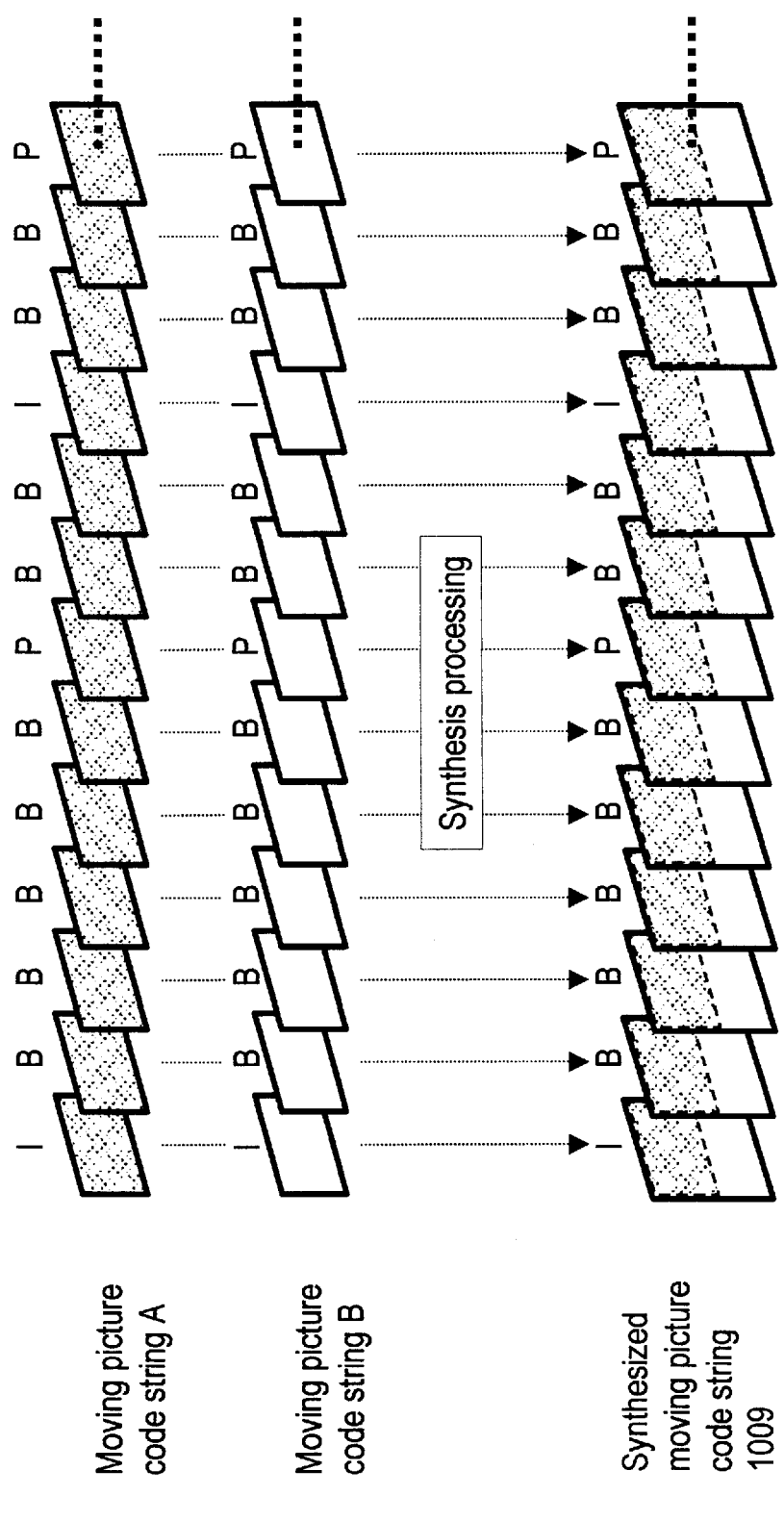
FIG. 12 is an explanatory diagram showing the synthesis motion of moving picture code strings for synthesis in the second embodiment of the invention.

FIG. 12 shows an example of synthesis of two moving picture code strings A, B vertically. Since the frame type patterns of all moving picture code strings issued from the picture coder 1001 are identical, when synthesizing in the frame unit, frame picture code strings having same frame type can be synthesized.

In the case of intra-frame synthesis, in the region division units such as DCT block, macroblock, or GOB (group of blocks), it is possible to synthesize by composing the frame picture code strings of each moving picture code string in a sequence conforming to the intended synthesized picture.

When synthesizing predictive frames, it is also possible to synthesize by reorganizing similarly in the region division units, and in particular the region including the predictive code may be reorganized in the higher region including the particular region.

In MPEG-1, the predictive code is issued into the region portion of macroblock composed of 16 pixels×16 pixels. As higher region including this macroblock, there is a slice region composed of plural macroblocks. Therefore, in the case of MPEG-1, it is synthesized in the slice region unit. The detail is same as explained in the first embodiment, and it is omitted herein.

In this embodiment, meanwhile, it is assumed that the video signal entered from outside is a non-compressed signal, but the video signal entered from outside can be composed by corresponding to the compressed signal. Of course, in the case of compressed signal, either processing of intra-frame compressing or between-frame compressing may be done.

That is, in the case that the entered video signal is a compressed signal, for example, compression is once expanded to a non-compressed signal, and the above process of compressing and coding may be done. In other example, the input video data may be transformed to a format suited to the format of moving picture code strings for synthesis. The apparatus for transforming the compression format of compressed signal is disclosed, for example, in Japanese Laid-open Patent Publication No. 8-221579 or Japanese Laid-open Patent Publication No. 6-78293, and by applying these technologies into the picture coder 1001, the compression format transforming function may be realized.

Third Embodiment

A moving picture synthesizing device in a third embodiment of the invention is described below. In the moving picture synthesizing device of the second embodiment mentioned above, the picture coder 1001 generates a GOP in the following condition in the moving picture code strings to be issued.

Condition 1) Concerning the frame type of each frame in the GOP, the occurrence pattern is the same in every GOP.

Condition 2) The number of frames contained in the GOP is a fixed number.

Figure 13:
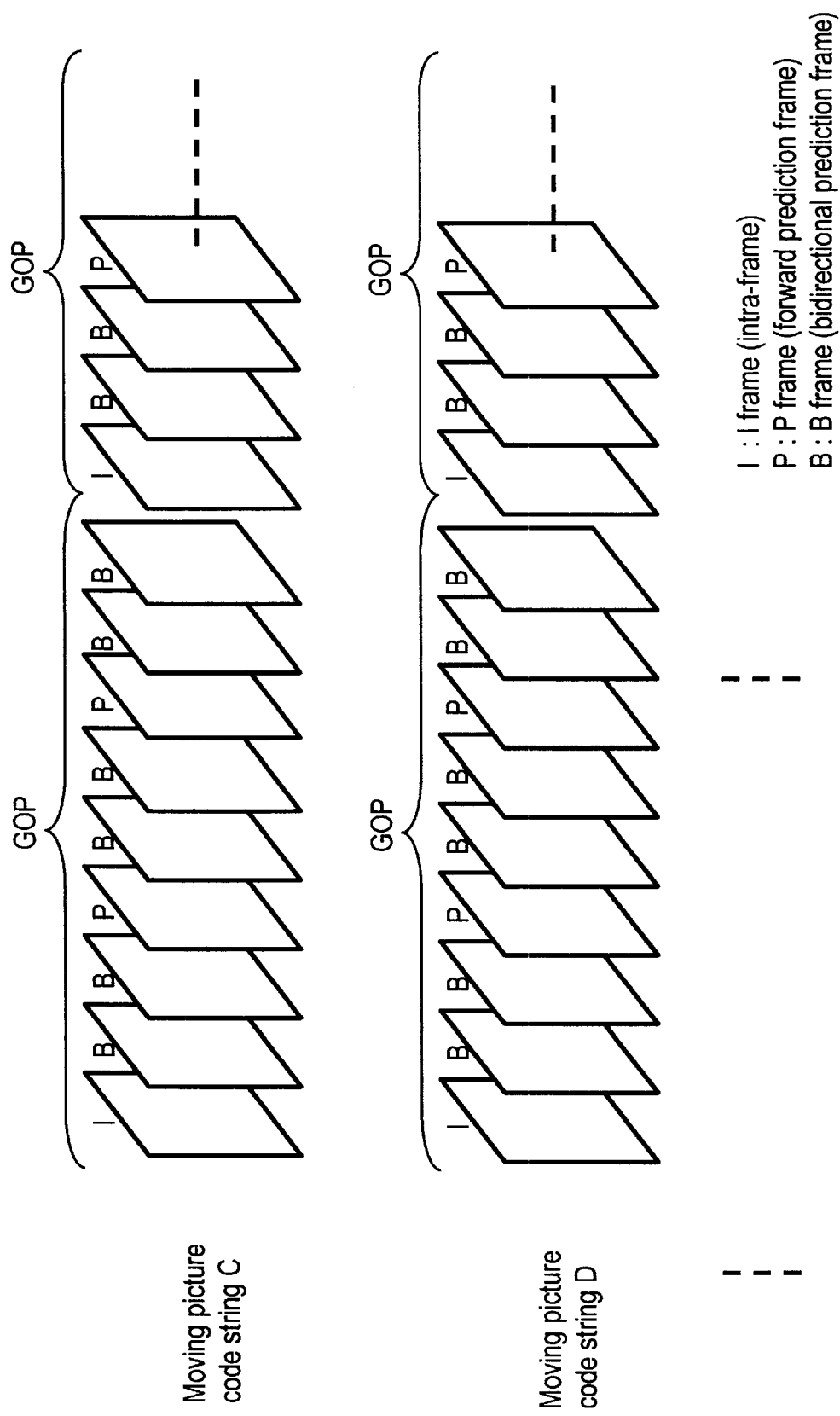
FIG. 13 is an explanatory diagram showing an example of GOP composition and frame type pattern of moving picture code strings for synthesis in a third embodiment of the invention.

FIG. 13 shows an example of using MPEG-1 as a compression code format. In FIG. 13, the GOP is composed of nine frames, and it shows that the frame type pattern is

IBBPBBPBB.

That is, all moving picture code strings for synthesis issued by the picture coder 1001 have a plurality of GOP, and the frame type occurrence pattern in each GOP is composed as shown in FIG. 13.

Figure 14:
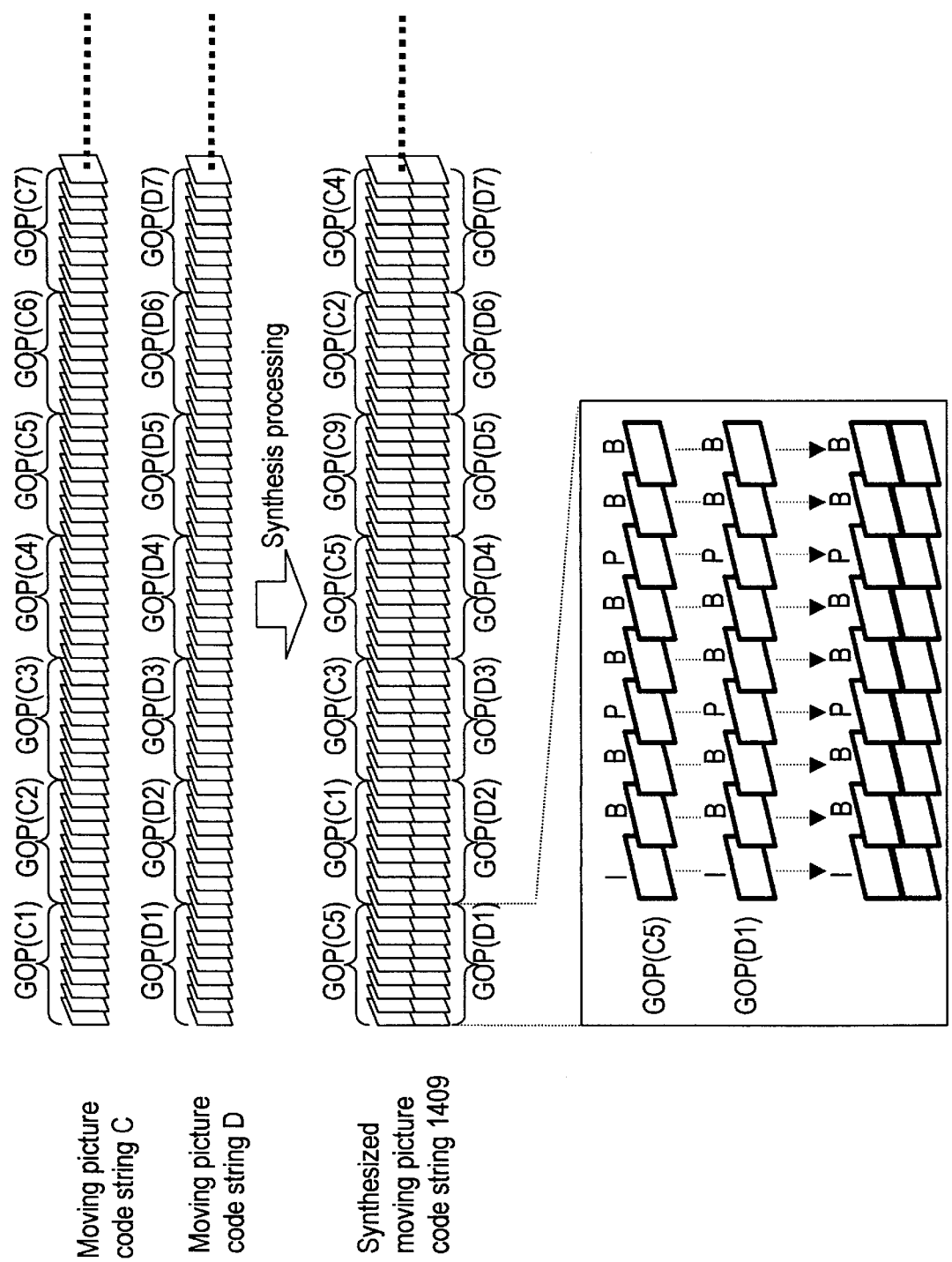
FIG. 14 is an explanatory diagram showing the synthesis motion of moving picture code strings for synthesis in the third embodiment of the invention.

FIG. 14 shows an example of synthesis of two moving picture code strings for synthesis C, D vertically. In FIG. 14, the moving picture code strings for synthesis C, D have the frame composition shown in FIG. 13. Code strings are sorted and synthesized in the GOP units so that the GOP sequence may be

C5, C1, C3, C5, C9, C2, C4, . . .

in the moving picture code signal for synthesis C, and

D1, D2, D3, D4, D5, D6, D7, . . .

in the moving picture code signal for synthesis D.

Thus, in all moving picture code strings for synthesis, since the frame type occurrence pattern in each GOP is all the same, if sorted in the GOP units, it is only enough to synthesize the frame picture code strings having the same frame type. It is hence easy to synthesize into one after sorting synthesis materials randomly in the GOP units.

Fourth Embodiment

A moving picture synthesizing device in a fourth embodiment of the invention is described below. This embodiment relates to a moving picture synthesizing device for adjusting the bit rate and playback speed of the moving picture after synthesis, by inserting a skip frame picture code string having no change from the preceding frame, when generating a synthesized moving picture code string for describing a synthesized moving picture from plural moving picture code strings.

Figure 15:
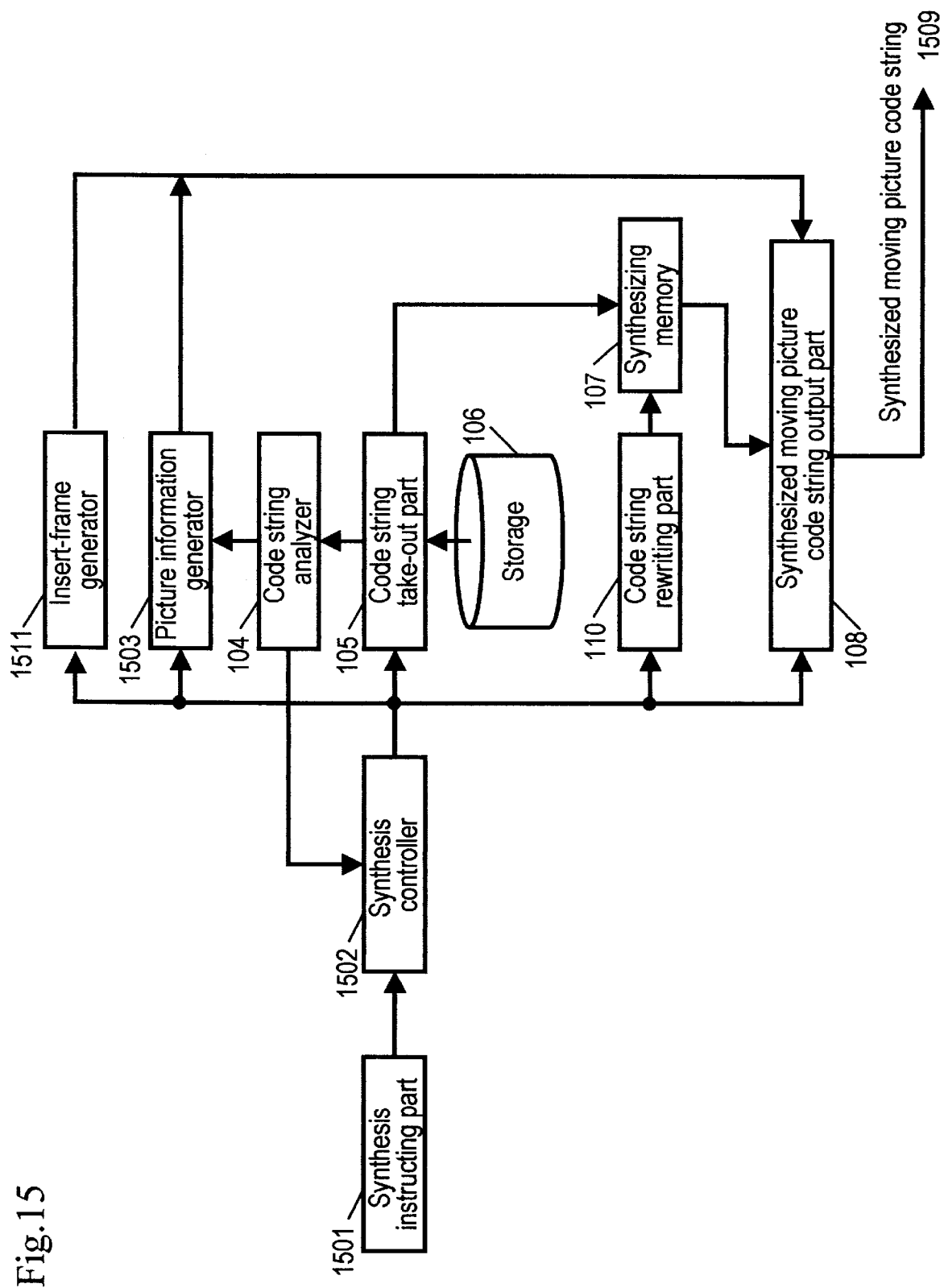
FIG. 15 is a block diagram showing a constitution of a moving picture synthesizing device in a fourth embodiment of the invention.

FIG. 15 is a block diagram showing the moving picture synthesizing device of the fourth embodiment. The same constituent elements as in the first embodiment shown in FIG. 1 are not explained herein. In FIG. 15, MPEG code string stored in the storage 106 are coded so as to be composed of I picture and P picture. Insert-frame generator 1511 generates skip frame picture code strings which are picture code strings for describing the same picture as the preceding frame picture. The skip frame picture code strings generated by the insert-frame generator 1511 are frame picture code strings in which all macroblocks are motion vector of zero in the prediction mode between forward frames in P picture or B picture in MPEG standard. The skip frame picture code strings only have the header information of minimum limit, and the quantity of information is almost zero.

Synthesis instructing part 1501 specifies the configuration of the moving picture described by the moving picture code strings stored in the storage 106 on the synthesized picture, and presents the interface for specifying the playback speed ratio after synthesis. The playback speed ratio is specified in a format of 1/N times of the playback speed, where N is a natural number.

Picture information generator 1503 calculates in consideration that the skip frame picture code strings having almost no quantity of information are inserted when generating the header information of synthesized moving picture code string. Since the bit rate of the entire moving picture code strings is about 1/N, the total of the bit rate of reduced moving picture divided by N is described in the header.

Figure 16:
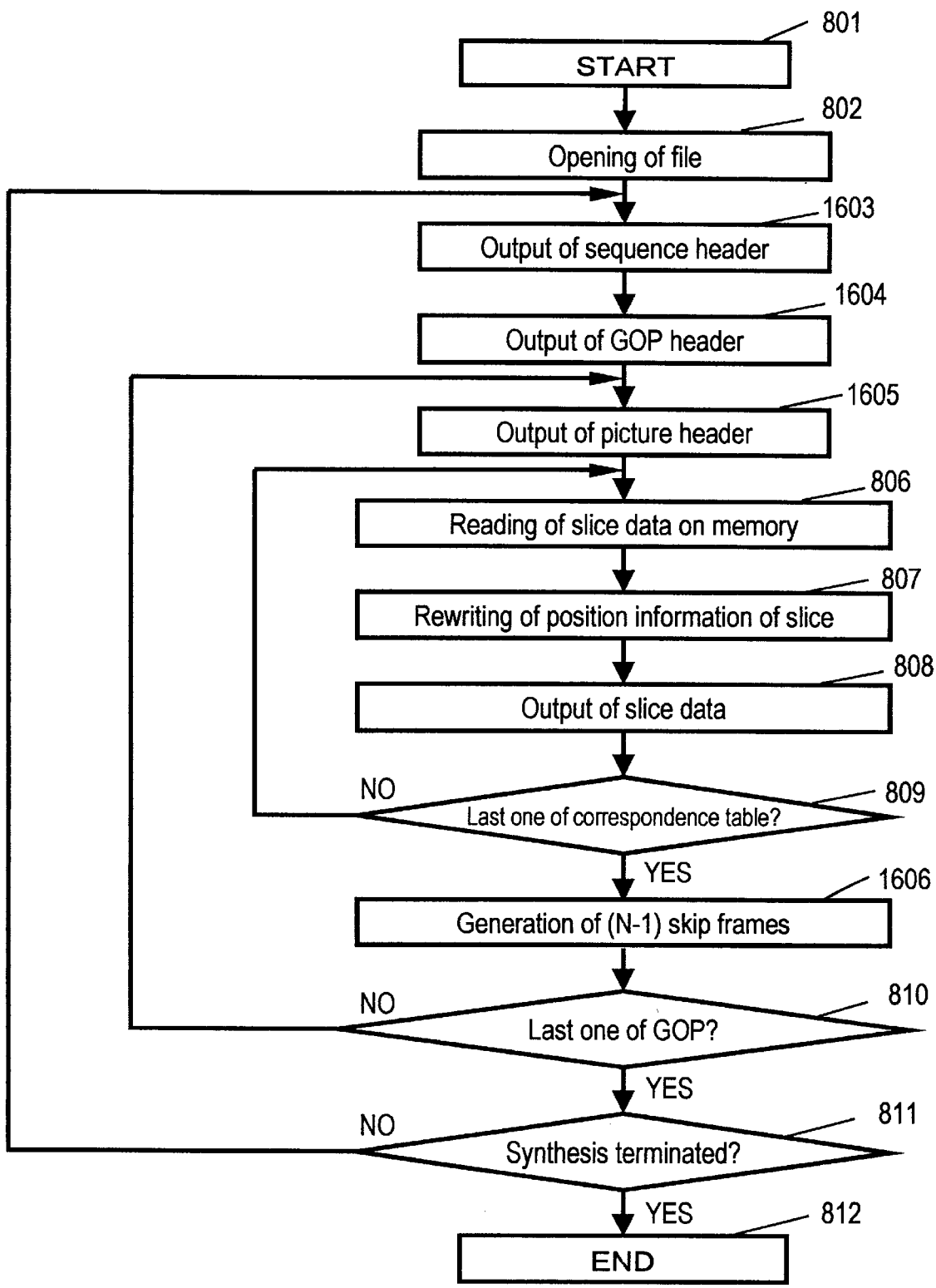
FIG. 16 is a flowchart showing the motion of synthesis controller of the moving picture synthesizing device in the fourth embodiment of the invention.

Synthesis controller 1502 receives a synthesis instruction from the synthesis instructing part 1501, and controls the synthesis process according to the flowchart in FIG. 16. The synthesis processing operation is nearly same as in the first embodiment, except for the following two points.

1) At steps 1603 to 1605 corresponding to steps 803 to 805, it is calculated in consideration that the skip frame picture code strings having almost no quantity of information are inserted when generating each header information. Since the bit rate of the entire moving picture is about 1/N, the total of the bit rate of the reduced moving picture divided by N is described in the header. Other header information is also corrected and operated in consideration that skip frame picture code strings are inserted.

2) Step 1606 is added; after it is judged at step 809 that frame picture code strings for one piece are synthesized, the insert-frame generator 1511 generates and inserts skip frame picture code strings for the portion of (N−1) pieces.

Figure 17:
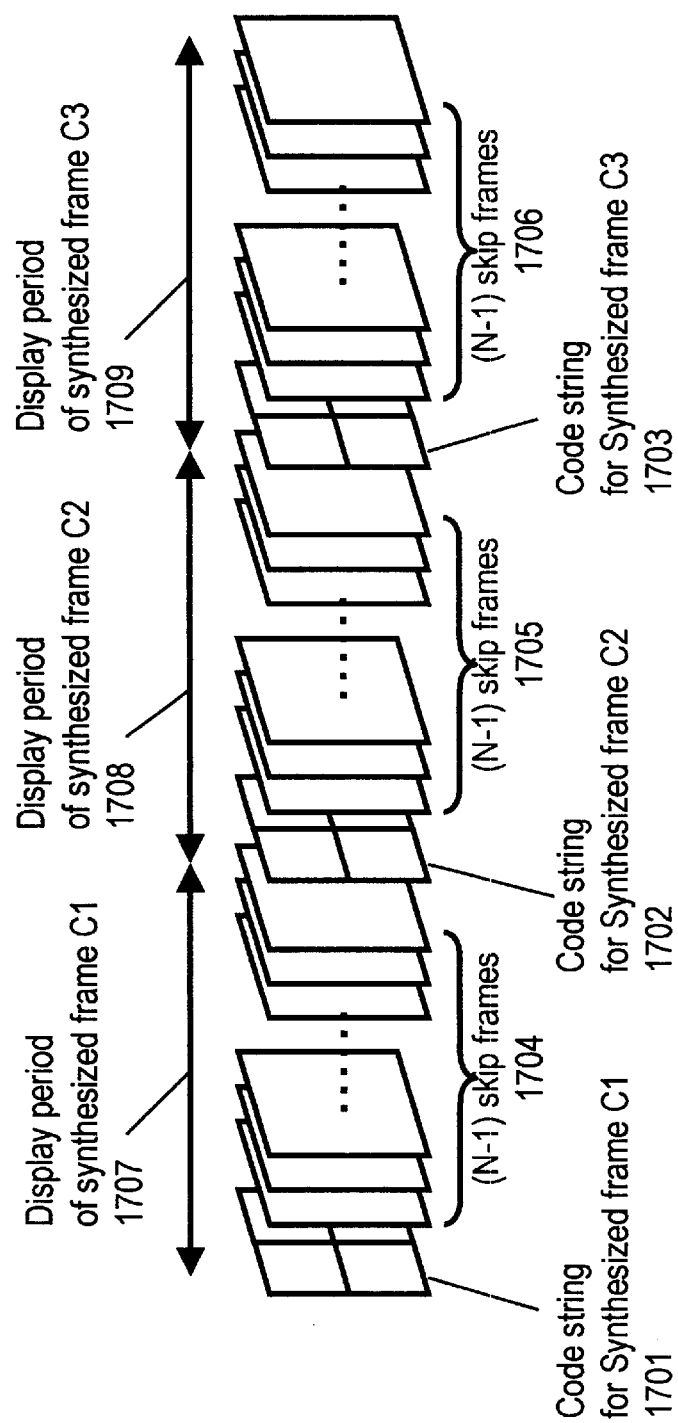
FIG. 17 is an explanatory diagram showing frame composition of synthesized moving picture code strings issued by synthesized picture output part of the moving picture synthesizing device in the fourth embodiment of the invention.

The synthesized moving picture code string 1509 to be issued describes, as shown in FIG. 17, the moving picture included skip frame pictures for N−1 pieces consecutively after each synthesized picture. When this moving picture is played back, the picture of synthesized farme C1 is displayed continuously in N frames from the display of the synthesized farme C1 until display of synthesized frame C2, and therefore, apparently, the playback speed is 1/N.

Besides, structurally, since skip frame picture code strings contain almost no information other than header, the bit rate of the entire synthesized moving picture is about 1/N. If many moving picture code strings are used in synthesis, the bit rate after synthesis increases, possibly exceeding the capacity of the video transmission route, and the processing quantity necessary for synthesis increases, and therefore synthesis is not performed in real time and the video seems to stop at the decoding and playing side, but, as mentioned above, by inserting skip frame picture code strings properly, the bit rate can be adjusted. At the same time, the reproduction speed can be adjusted to 1/N.

In the embodiment, the MPEG code strings stored in the storage 106 are coded so as to be composed of I picture and P picture, but this is no limitative. However, in the MPEG code strings composed only of I picture and P picture, since the display sequence and storing sequence are the same, and all frames can be utilized as predictive frames, so that, as a merit, the skip frame picture code strings can be freely inserted.

Fifth Embodiment

A moving picture synthesizing device in a fifth embodiment of the invention is described below. The fifth embodiment of the invention is realized by expanding the function of the moving picture synthesizing device of the fourth embodiment so that it is possible to synthesize the moving picture code strings having B picture frame. That is, in this moving picture synthesizing device, when synthesizing MPEG code strings different between the frame sequence in storing and frame sequence in display, the bit rate and playback speed can be adjusted by inserting skip frame picture code strings.

Figure 18:
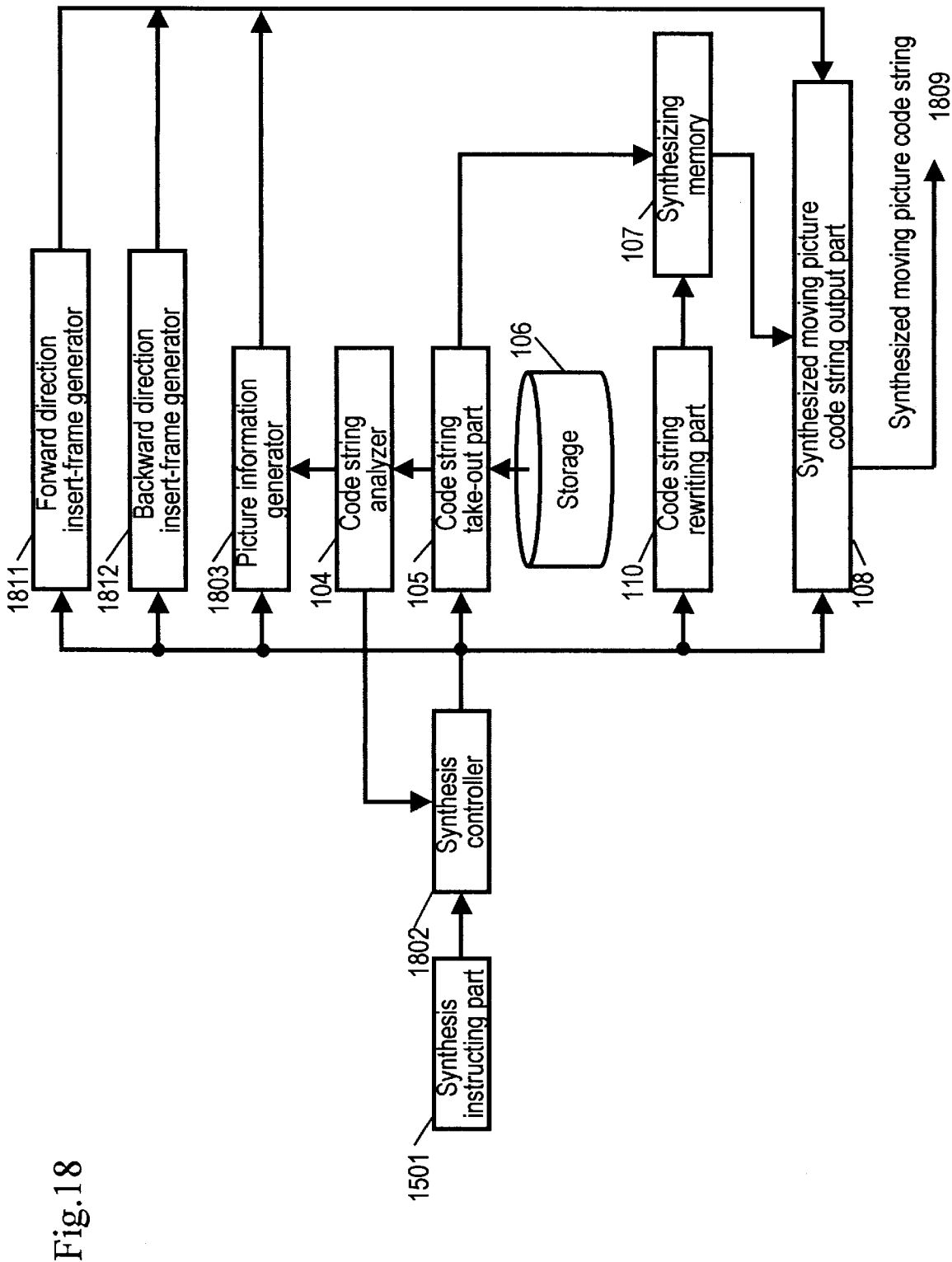
FIG. 18 is a block diagram showing a constitution of a moving picture synthesizing device in a fifth embodiment of the invention.

FIG. 18 is a block diagram showing a constitution of the moving picture synthesizing device of the embodiment. The same constituent elements as in the preceding embodiments are not explained herein. In FIG. 18, the constitution of the moving picture synthesizing device further comprising forward direction insert-frame generator 1811 and backward direction insert-frame generator 1812, as an expansion of function of the insert-frame generator 1511 of the moving picture synthesizing device in the fourth embodiment shown in FIG. 15.

Figure 19:
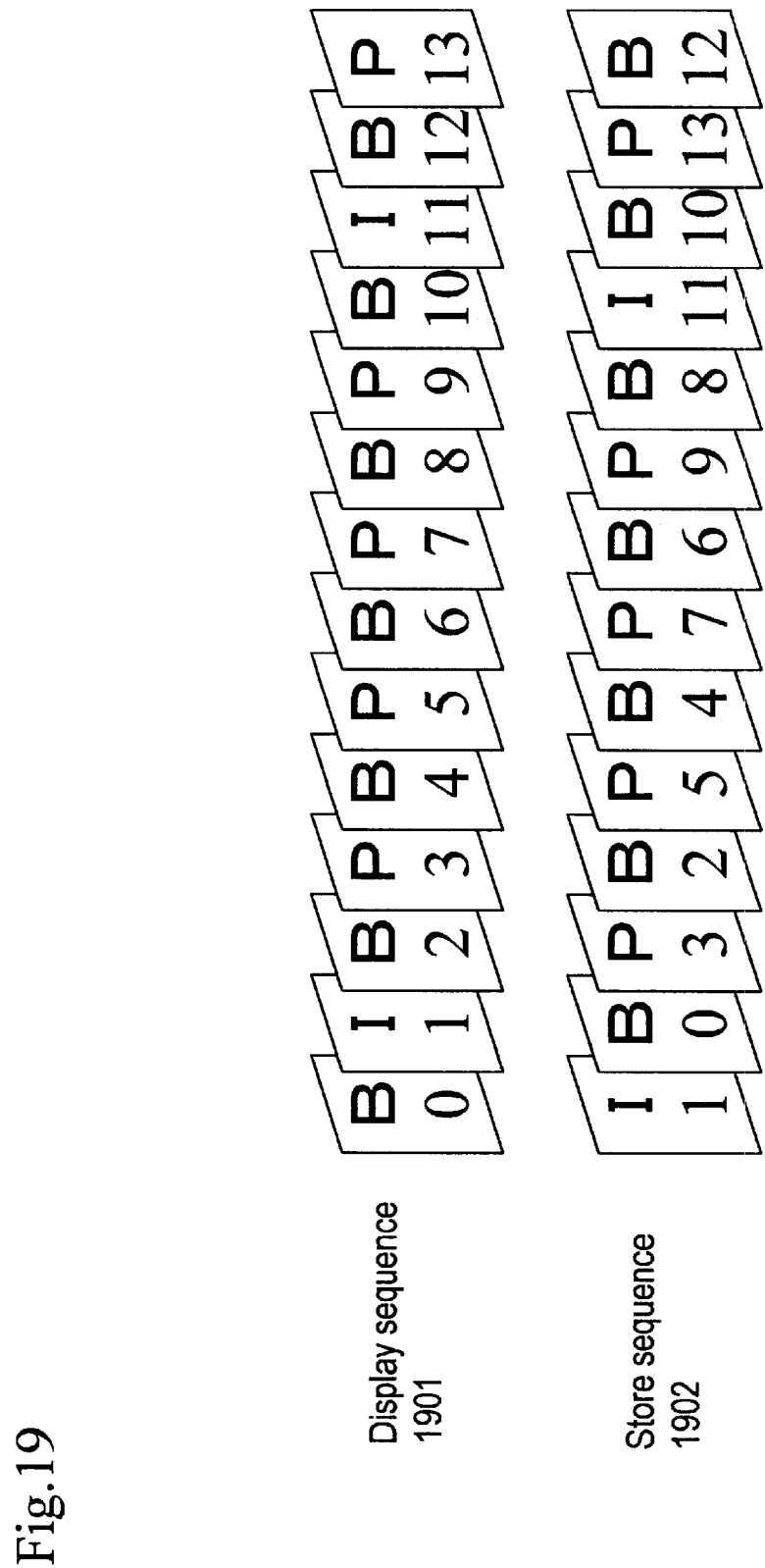
FIG. 19 is an explanatory diagram showing frame composition of moving picture code strings used for synthesis in the moving picture synthesizing device in the fifth embodiment of the invention.

Moving pictures stored in the storage 106 are MPEG code strings containing B picture frame. In the MPEG code strings containing B picture frame, as shown in FIG. 19, the display sequence 1901 and store sequence 1902 of each frame are different.

The forward direction insert-frame generator 1811 operates same as the insert-frame generator 1511 in the moving picture synthesizing device in the fourth embodiment shown in FIG. 15, and generates skip frame picture code strings of B picture predicted at motion vector 0 from the preceding frame. On the other hand, the backward direction insert-frame generator 1812 generates skip frame picture code strings of B picture predicted at motion vector 0 from the succeeding frame. The picture information generator 1803 calculates in consideration that each skip frame picture code string having almost no quantity of information is inserted when generating header information of synthesized moving picture code string. Since the bit rate of the entire moving picture code strings is about 1/N, the total of the bit rate of the reduced moving picture divided by N is described in the header.

Figure 20:
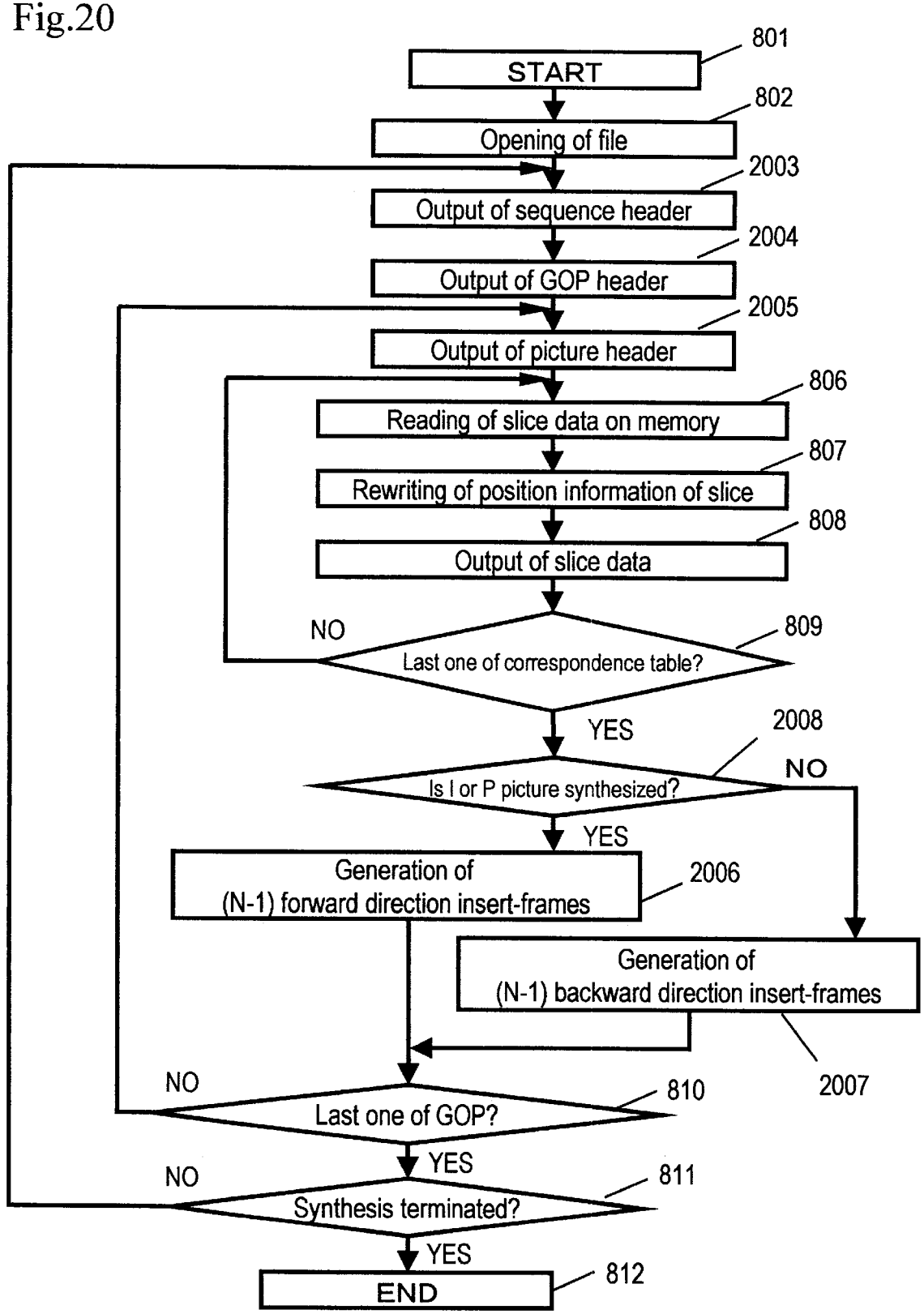
FIG. 20 is a flowchart showing the motion of synthesis controller of the moving picture synthesizing device in the fifth embodiment of the invention.

Synthesis controller 1802 receives a synthesis instruction from the synthesis instructing part 1501, and controls the synthesis process according to the flowchart in FIG. 20. The synthesis processing operation is nearly same as in the fourth embodiment, except for the following two points.

1) At steps 2003 to 2005 corresponding to steps 1603 to 1605, it is calculated in consideration that two types of skip frame picture code strings having almost no quantity of information are inserted when generating each header information. Since the bit rate of the entire moving picture is about 1/N, the total of the bit rate of the reduced moving picture divided by N is described in the header. Other header information is also corrected and operated in consideration that two types of skip frame picture code strings are inserted.

2) Steps 2006 to 2008 are added instead of step 1606. That is, after it is judged at step 809 that frame picture code string for one piece are synthesized, at step 2008, it is judged if I picture or P picture is synthesized, and after synthesis of I picture or P picture, forward direction insert-frame picture code strings are generated and inserted by (N–1) pieces, and after synthesis of B picture, backward direction insert-frame picture code strings are generated and inserted by (N–1) pieces.

Figure 21:
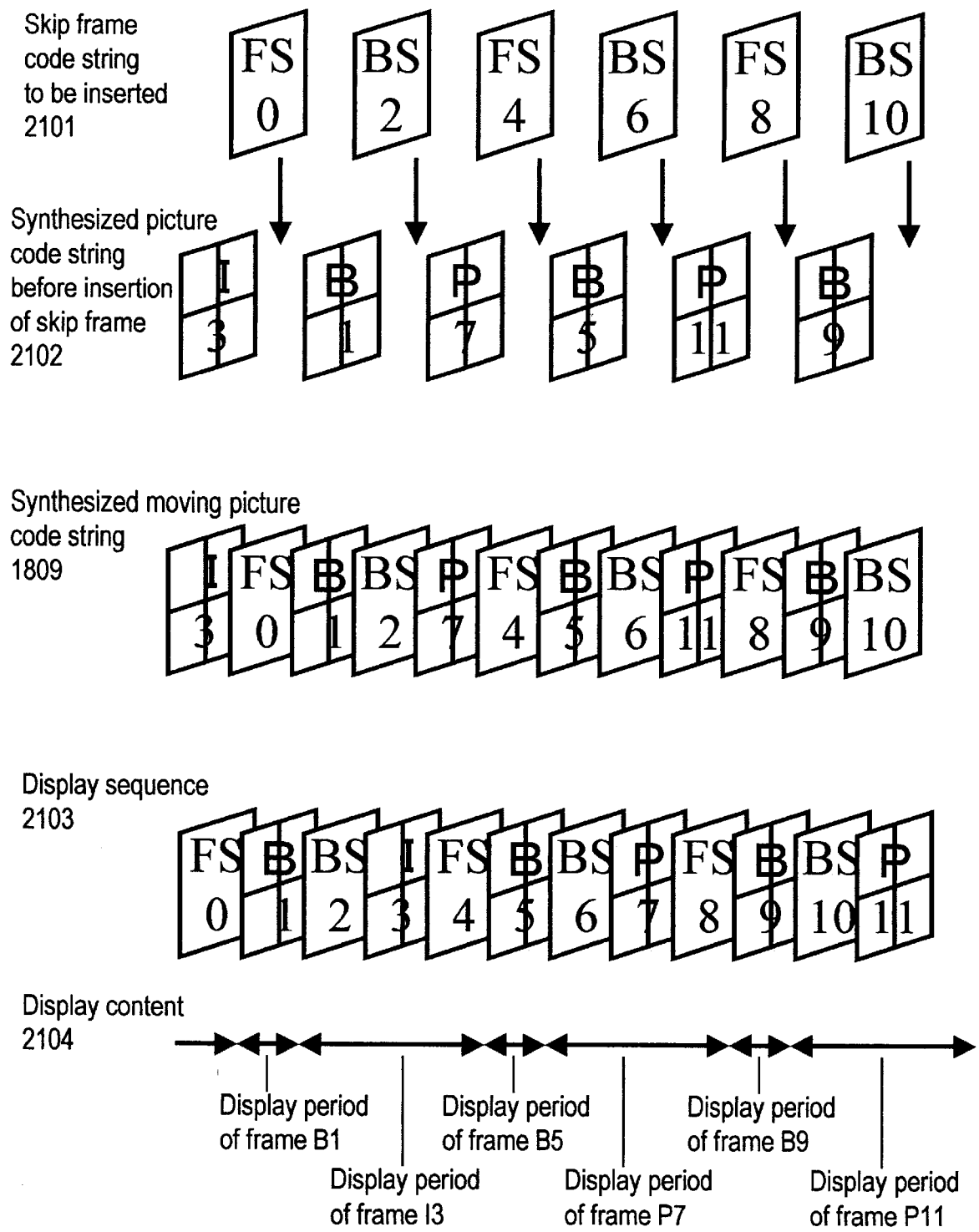
FIG. 21 is an explanatory diagram showing frame composition of synthesized moving picture code strings issued by synthesized picture output part of the moving picture synthesizing device in the fifth embodiment of the invention.

FIG. 21 shows an example at the time of N=2. In the diagram, FS denotes a skip frame picture code string inserted by the forward direction insert-frame generator 1811, and BS denotes a skip frame picture code string inserted by the backward direction insert-frame generator 1812.

A synthesized frame string 2102 shows the process of the frames to be synthesized as being sequentially read out from the storage 106, and skip frame strings 2101 are sequentially inserted therein as shown in the diagram, and the synthesized moving picture code string 1809 is generated. When decoding and playing the synthesized moving picture code string 1809, it is displayed as shown in display sequence 2103. The synthesized picture being actually displayed is as shown in display content 2104.

That is, the synthesized moving picture code string 1809 is played back according to the display sequence 2103, and after the picture of the synthesized No.1-B picture frame is displayed for the portion of one frame, the picture of the No.3-I picture frame is displayed for the portion of three frames, the picture of the No.5-B picture frame is displayed for the portion of one frame, and the picture of the No.7-P picture frame is displayed for the portion of three frames.

Herein, the decoding and playing speed of the synthesized moving picture code string 1809 is ½ as compared with the case not inserting each skip frame picture code string. Since each insertion frame has almost no data other than the header, the bit rate is about ½. Generally, by inserting N–1 insertion frames, the bit rate of the entire moving picture is about 1/N. At the same time, as compared with the case not inserting skip frame picture code string, the reproduction speed ratio is 1/N.

Sixth Embodiment

A moving picture synthesizing device in a sixth embodiment of the invention is described below. This embodiment relates to a moving picture synthesizing device for synthesizing a synthesized moving picture code string from plural picture code strings obtained by coding after decimating and taking out video signal entered from outside in every K frames, and synthesizing a synthesized moving picture code string capable of playing at K times of actual time, where K is a natural number.

Figure 22:
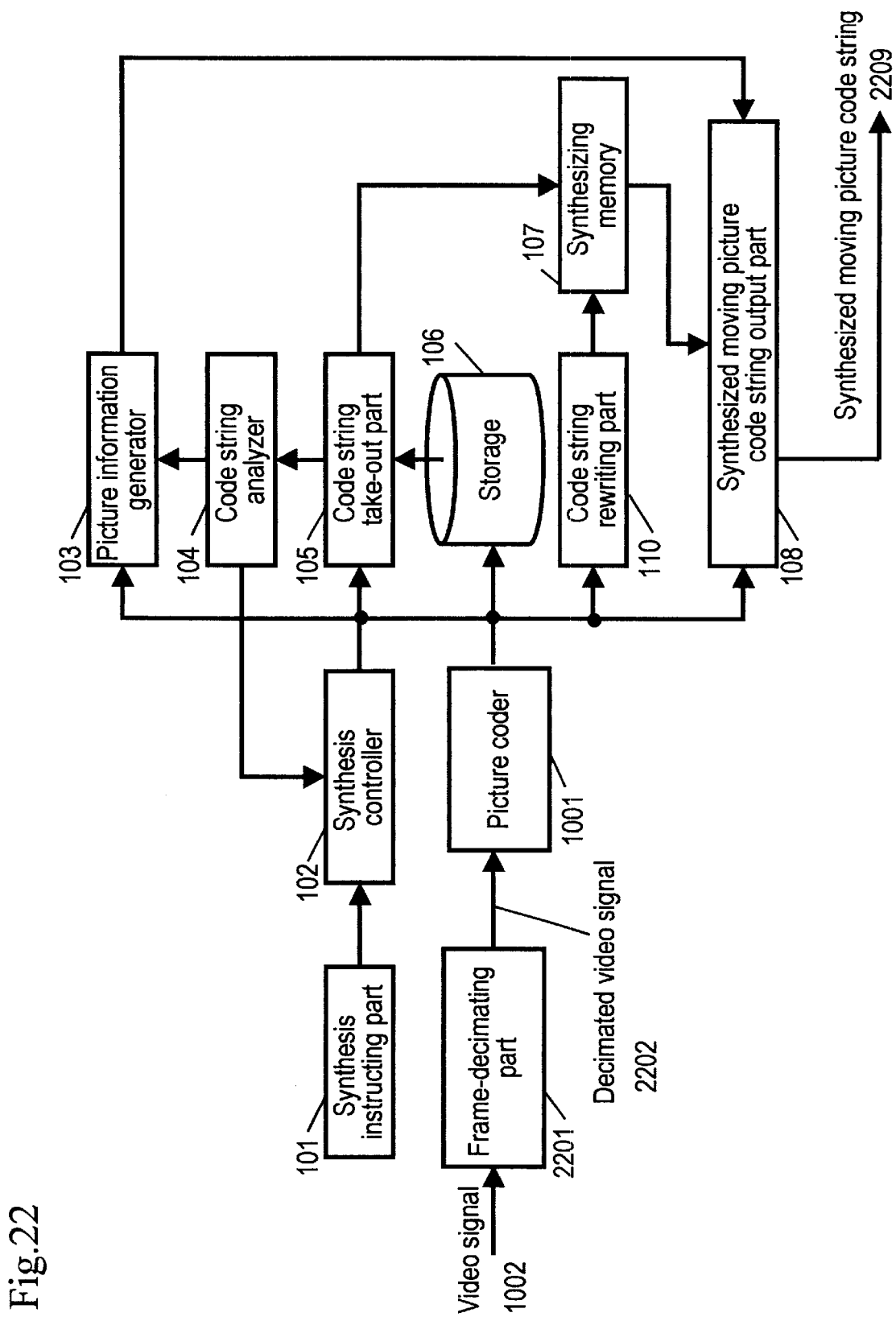
FIG. 22 is a block diagram showing a constitution of a moving picture synthesizing device in a sixth embodiment of the invention.

FIG. 22 is a block diagram showing a constitution of the moving picture synthesizing device of the sixth embodiment. In FIG. 22, the constitution of the entire device is similar to the moving picture synthesizing device of the second embodiment shown in FIG. 10, and further comprises frame-decimating part 2201 for decimating frames in a specific frame period, in video signal 1002 entered from outside, and issuing a decimated video signal 2202.

Figure 23:
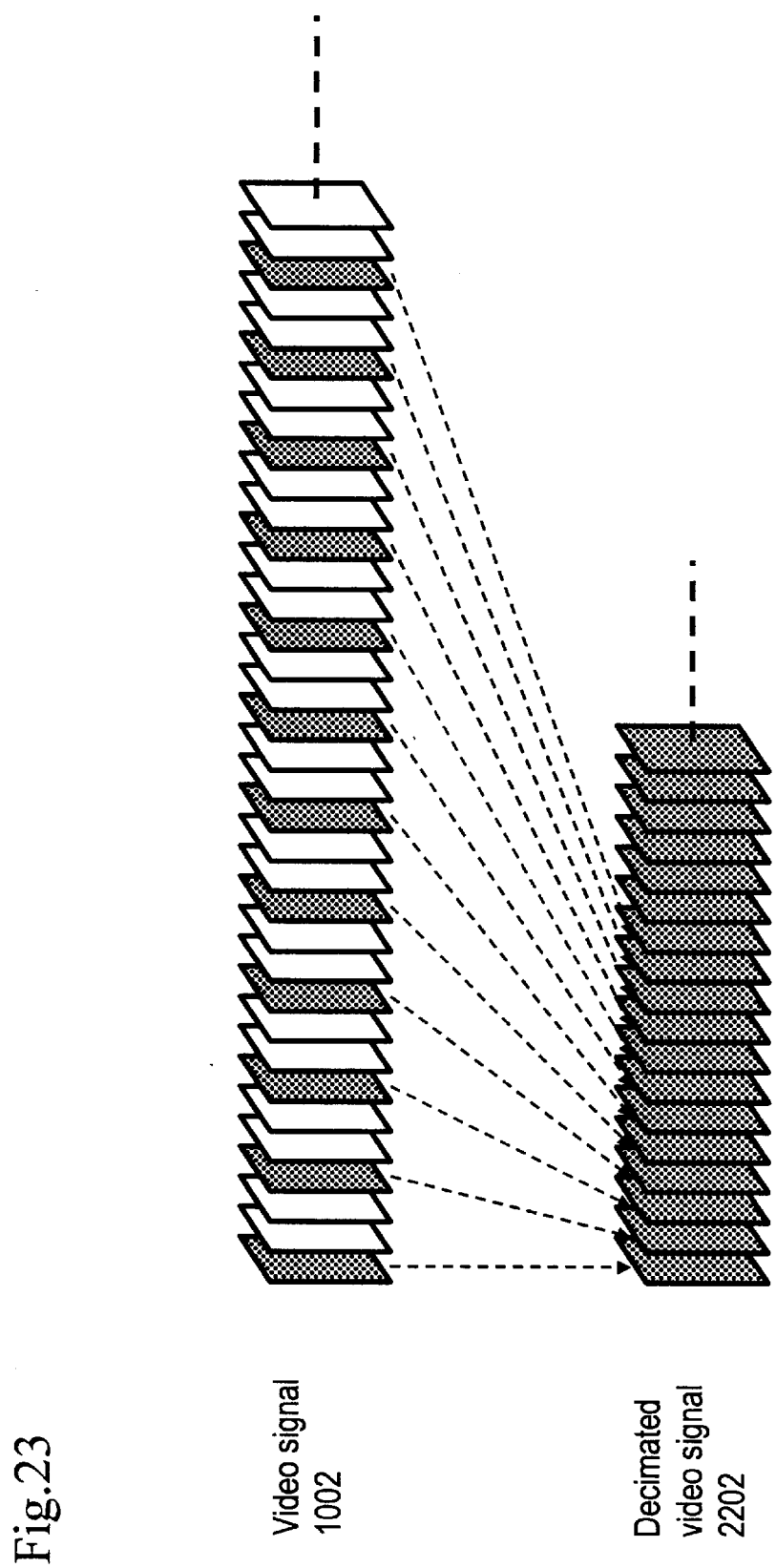
FIG. 23 is an explanatory diagram showing the motion of frame-decimating part in the sixth embodiment of the invention.

The frame-decimating operation by the frame-decimating part 2201 is shown in FIG. 23. In the example in FIG. 23, one frame out of every three frames of input video signal 1002 is issued. That is, if the input video signal has 90 frames, the frame-decimating part 2201 issues a video signal composed of 30 frames as a result of decimating process.

Picture coder 1001 compresses and codes the decimated video signal 2202, and generates and issues a moving picture code string. Since this moving picture code string has been coded after decimating from 90 frames to 30 frames by the frame-decimating part 2201, when the synthesized moving picture code string is generated by using this moving picture code string, the portion of the synthesized picture after decoding disposing this moving picture code string has a playback speed of three times that of the playback speed of the video signal 1002 at the time of input.

Seventh Embodiment

A moving picture synthesizing device in a seventh embodiment of the invention is described below. This embodiment relates to a moving picture synthesizing device for synthesizing a synthesized moving picture code string capable of playing at the same speed as the playback speed of the video signal at the time of input, by inserting unchanged frames for the portion of decimation, when synthesizing a synthesized moving picture code string from plural moving picture code strings coded after decimating video signal entered from outside.

Figure 24:
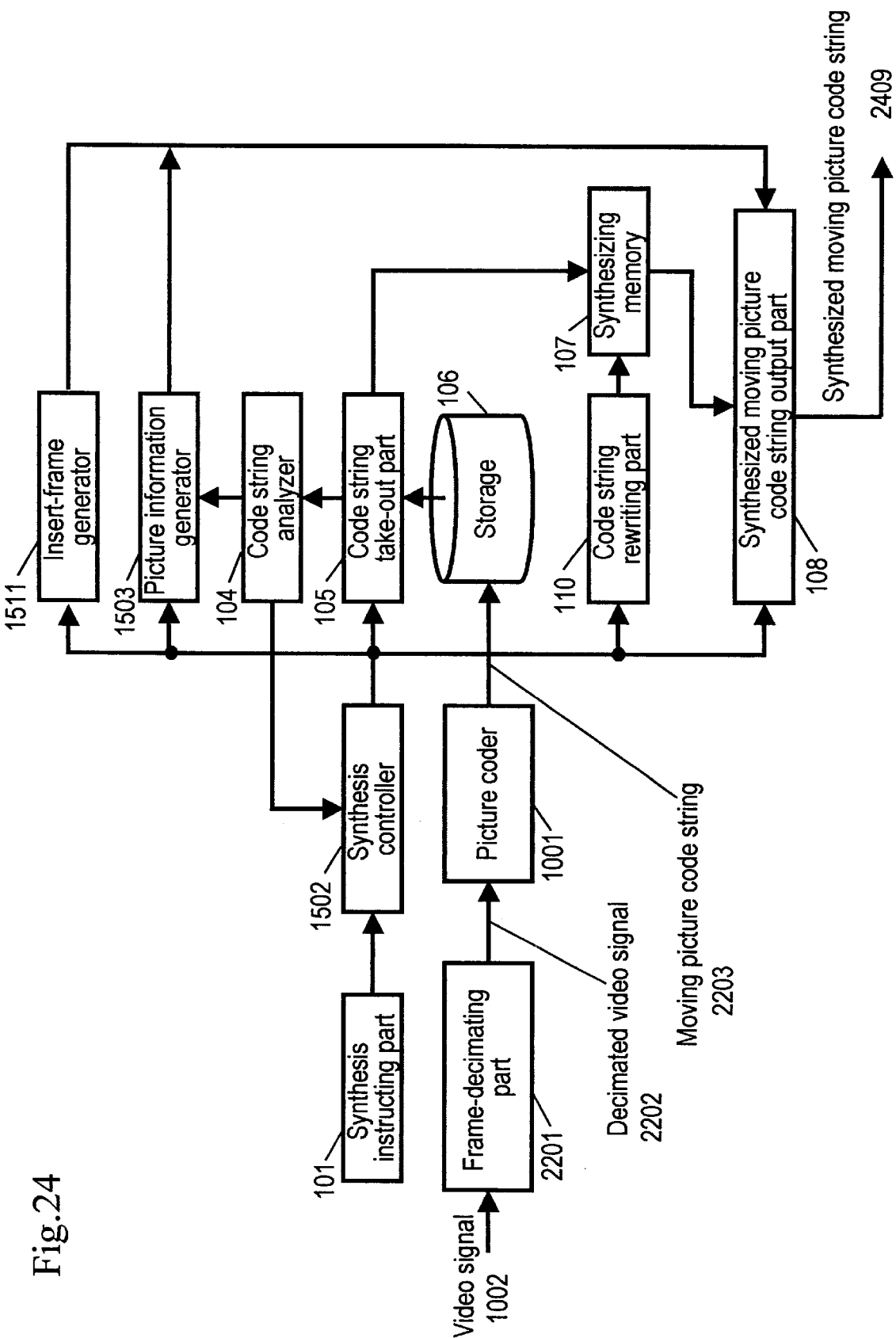
FIG. 24 is a block diagram showing a constitution of a moving picture synthesizing device in a seventh embodiment of the invention.

FIG. 24 is a block diagram showing a constitution of the moving picture synthesizing device of the embodiment. The entire constitution of the embodiment is a combination of the moving picture synthesizing device of the fourth embodiment shown in FIG. 15 and the moving picture synthesizing device of the sixth embodiment shown in FIG. 22. Each constituent element is as described above, and detailed description is omitted.

Figure 25:
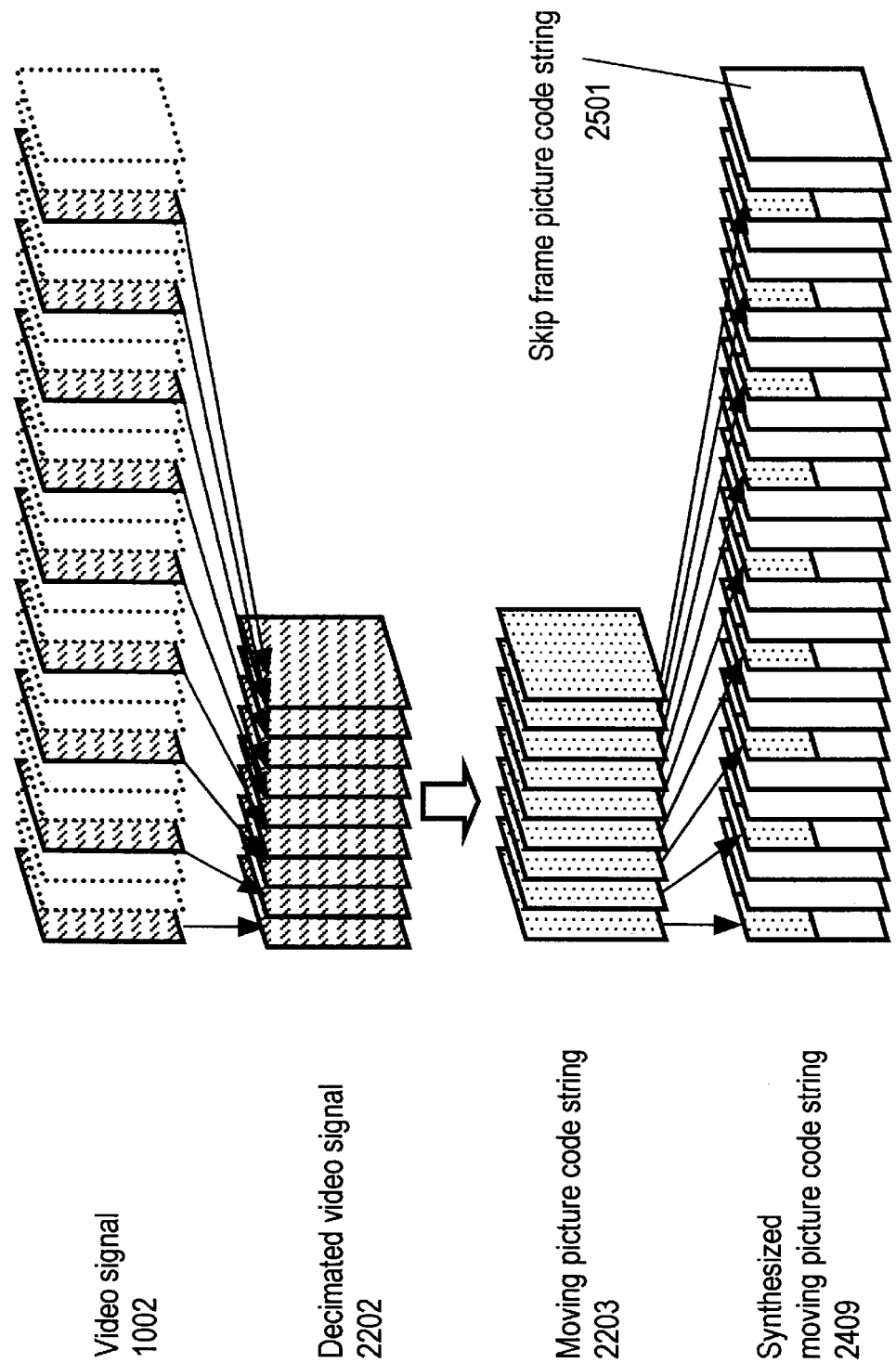
FIG. 25 is an explanatory diagram showing the corresponding relation of frame composition of moving picture or moving picture code strings in principal parts of the moving picture synthesizing device in the seventh embodiment of the invention.

FIG. 25 shows an example of synthesis processing operation of the embodiment. Frame-decimating part 2201 decimates video signal 1002 entered from outside in every three frames, and issues a decimated video signal 2202. Picture coder 1001 compresses and codes the decimated video signal 2202, and generates a moving picture code string 2203. In the moving picture code string 2203 describing the decimated video signal 2202, every time synthesizing in the frame unit, skip frame picture code strings 2501 for describing the same picture as the result of synthesizing process are inserted for the portion of two frames.

That is, a synthesized moving picture code string 2409 is composed of, 90 frames, a frame picture code string for 30 frames synthesized from each frame of moving picture code string, and a skip frame picture code string for 60 frames. That is, when synthesizing the moving picture code strings for synthesis enhanced in playback speed by three times by the frame-decimating part 2201, it is possible to generate a synthesized moving picture code string capable of playing at the same speed as the original input video signal 1002.

The device constitution in this embodiment is a combination of the moving picture synthesizing device of the fourth embodiment shown in FIG. 15 and the moving picture synthesizing device of the sixth embodiment shown in FIG. 22, but it is also possible to realize by a combination of the moving picture synthesizing device of the fifth embodiment shown in FIG. 18 and the moving picture synthesizing device of the sixth embodiment shown in FIG. 22.

Eighth Embodiment

A moving picture synthesizing device in an eighth embodiment of the invention is described below. This embodiment relates to a moving picture synthesizing device for synthesizing an MPEG code string composed of I picture and P picture by decimating video signal entered from outside once in every two frames, and compressing and coding, and at this time by generating and inserting a frame picture code string for describing a frame picture composed of pixels expressed by the average of pixels of the synthesized frame picture described by the preceding and succeeding synthesized frame picture code strings, the moving picture played back at the same playback speed as the original video signal is synthesized.

Figure 26:
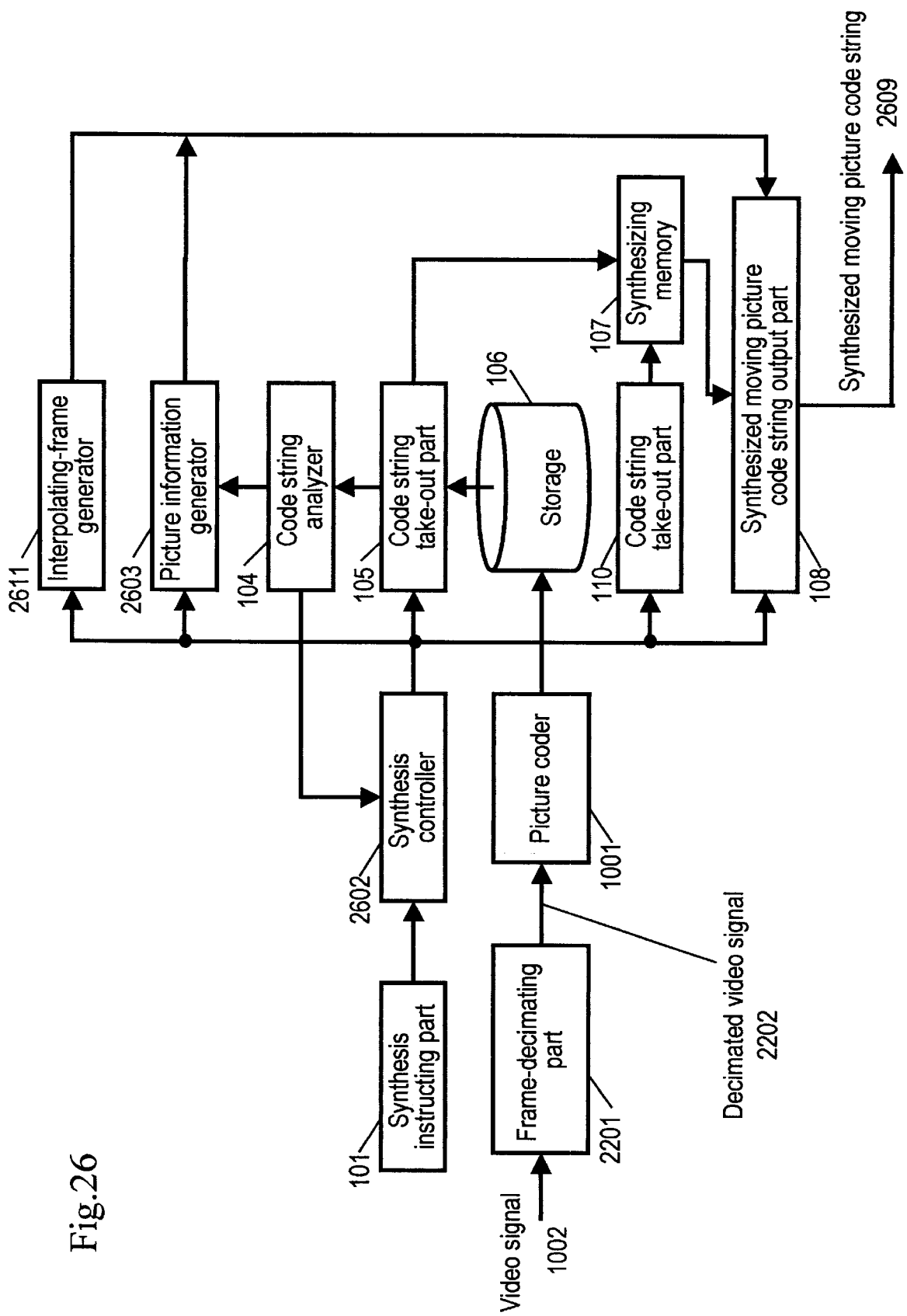
FIG. 26 is a block diagram showing a constitution of a moving picture synthesizing device in an eighth embodiment of the invention.
Figure 27:
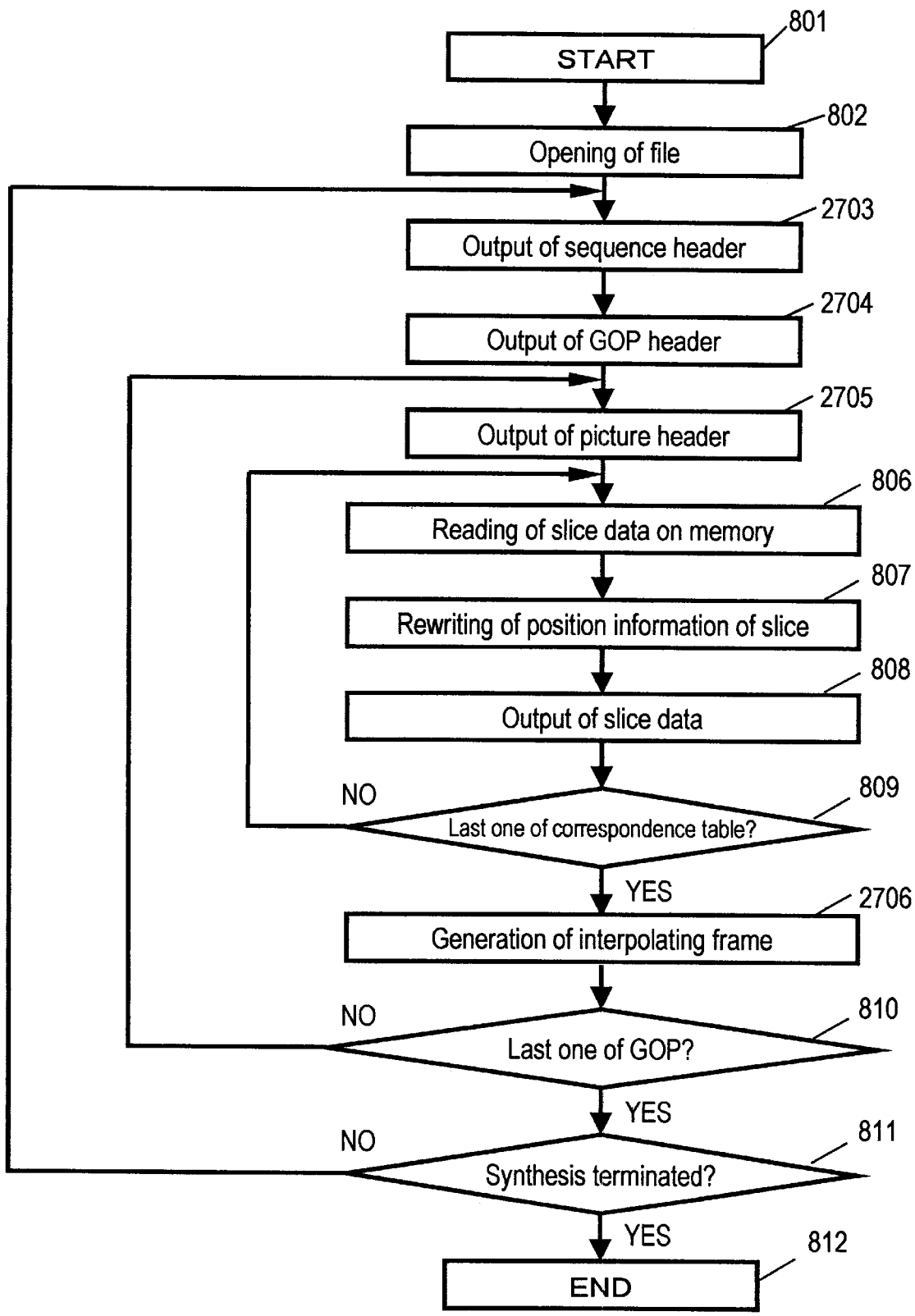
FIG. 27 is a flowchart showing the motion of synthesis controller of the moving picture synthesizing device in the eighth embodiment of the invention.

FIG. 26 is a block diagram showing a constitution of the moving picture synthesizing device of the embodiment. The constitution of the moving picture synthesizing device of the embodiment is similar to the moving picture synthesizing device of the seventh embodiment in FIG. 24, except that the insert-frame generator 1511 is replaced by interpolating-frame generator 2611 for generating an intermediate picture of preceding and succeeding frames.

The interpolating-frame generator 2611 generates B picture of bidirectional prediction mode at motion vector 0 from preceding and succeeding frames. The interpolating frame picture is an average picture by rounding off the preceding and succeeding frame pictures in the pixel unit, and shows an intermediate picture of the preceding and succeeding frames.

Picture information generator 2603 calculates in consideration that skip frame picture code strings (i.e. the interpolating frame) having almost no quantity of information are inserted when generating the header information of the synthesized moving picture code string.

Synthesis controller 2602 controls the synthesis process according to the flowchart in FIG. 28, by receiving a synthesis instruction from the synthesis instructing part 101. The synthesizing process operation is nearly same as the operation of the fifth embodiment, except for the following three points.

1) The moving picture code string used in synthesis is obtained by decimating the video signal 1002 once in every two frames by the frame-decimating part 2201, and compressing and coding by the picture coder 1001.

2) At steps 2703 to 2705 corresponding to steps 1603 to 1605, when generating each header information, it is calculated in consideration of insertion of skip frame picture code strings having almost no quantity of information, that is, frame picture code strings describing the frame picture composed of pixels expressed by the average of pixels of the synthesized frame picture described by the preceding and succeeding synthesized frame picture code strings. Other header information is corrected and operated in consideration of insertion of skip frame picture code strings.

3) At step 2706 corresponding to step 1606, every time it is judged at step 809 that the frame picture code strings for one frame are synthesized, the interpolating-frame generator 2711 generates and inserts one skip frame which is a frame picture code string describing a frame picture composed of pixels expressed by the average of pixels of the synthesized frame picture described by the preceding and succeeding synthesized frame picture code strings.

The operation is described below by reference to FIG. 28. In FIG. 28, the frame indicated by D is an interpolating frame. A synthesized frame string 2802 shows the process of the frames to be synthesized as being read out sequentially from the storage 106, and interpolated skip frame strings 2801 are sequentially inserted therein as shown in the diagram, and a synthesized moving picture code string 2609 is generated. At the time of decoding and playing of this synthesized moving picture code string 2609, it is displayed as shown in the display sequence 2803. Actually, the displayed synthesized picture is as shown in the display content 2804.

The synthesized moving picture code strings 2609 are decoded and played back in the sequence shown in the display sequence 2803, and each frame is displayed by the time indicated by the display content 2804. First, No.0-I picture is displayed, then the average picture of this picture and the No.2-P picture in pixel unit is displayed, which is followed by the No.2-P picture.

Thus, the playback speed ratio of synthesized moving picture is twice as fast as the playback speed of the moving pictures described by the moving picture code strings used in synthesis, and the playback speed of the original video before decimation is realized. Herein, the picture generated by the interpolating-frame generator 2611 is an intermediate picture of the preceding and succeeding frame pictures, and is hence close to the frame picture decimated before coding, and therefore a synthesized moving picture smoother in the time axis direction than in the seventh embodiment is obtained.

Thus, in this embodiment, since the size of the stored moving picture code string is ½, the moving picture code string can be stored efficiently. Moreover, the quantity of information of the interpolating frame picture code string is almost zero, and as compared with the first embodiment, the bit rate of the synthesized moving picture code string is about ½.

In the embodiment, number of frame interval decimated is "2" but it is not limited. That is, supposing M to be a natural number of 2 or more, frames of video signal 1002 are decimated by every M−1, and video signal of M times speed are generated, and M−1 intermediate pictures can be interpolated at the time of synthesis. In particular, when M=2 as in this embodiment, the smoothness in the time axis direction may be further made uniform.

Ninth Embodiment

Figure 29:
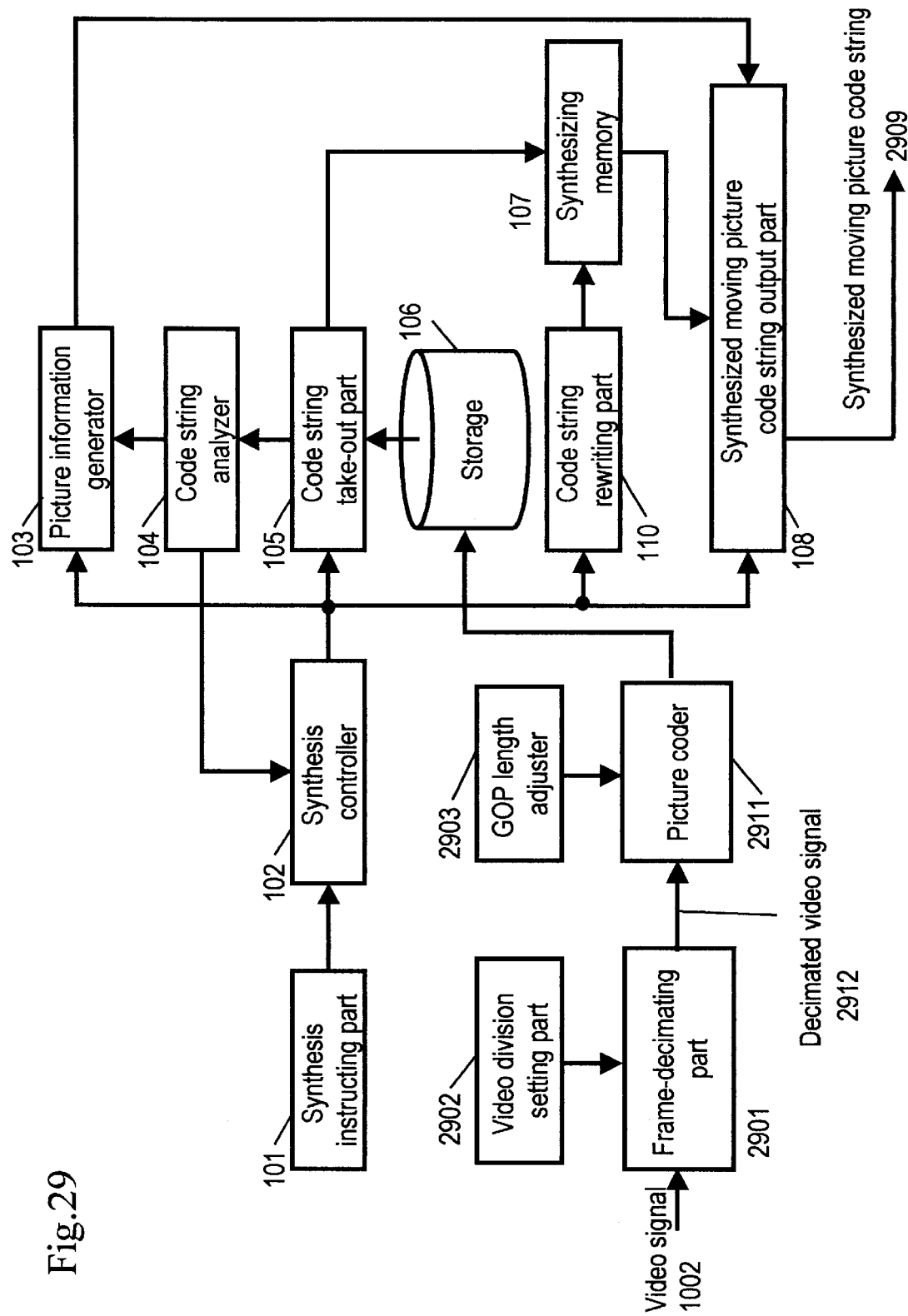
FIG. 29 is a block diagram showing a constitution of a moving picture synthesizing device in a ninth embodiment of the invention.

A moving picture synthesizing device in a ninth embodiment of the invention is described below. FIG. 29 is a block diagram showing a constitution of the moving picture synthesizing device of the embodiment. The constitution of the moving picture synthesizing device of the embodiment is based on the constitution of the device of the sixth embodiment shown in FIG. 22, and further video division setting part 2902 and GOP length adjuster 2903 are added, and the function of the frame-decimating part 2901 and picture coder 2911 is expanded.

That is, the frame-decimating part 2901 decimates, not in the individual frame units, but in the video division units (a video division being one group) in the video divisions separated by the video division frame positions instructed by the video division setting part 2902, and issues the decimated video signal.

Figure 30:
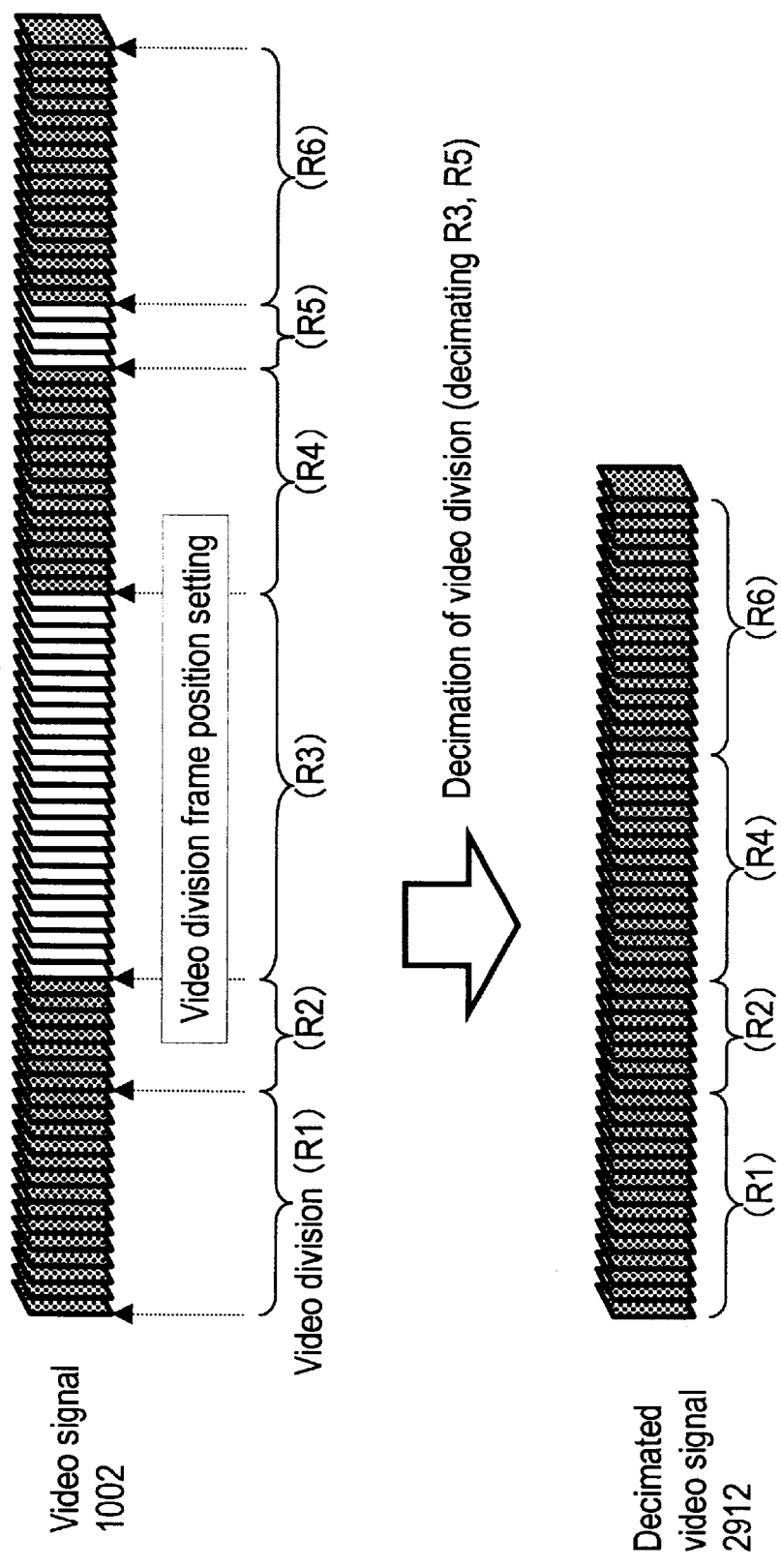
FIG. 30 is an explanatory diagram showing the motion of video division setting part and frame-decimating part in the ninth embodiment of the invention.

FIG. 30 shows the operation of video division frame position setting by the video division setting part 2902 and the decimating operation of video division by the frame-decimating part 2901.

The video division setting part 2902 may be provided with an automatic setting function of division frame position using video division automatic detection algorithm by picture processing, a setting function of division frame position by the user, or an automatic setting function of division frame position by a specific period. That is, in various forms, video division frame positions may be set in an arbitrary number at arbitrary frame positions.

The video division automatic detection algorithm by picture processing is disclosed, for example, Japanese Laid-open Patent Publication No. 8-214315, and it can be applied.

The frame-decimating part 2901 decimates in the video division unit in arbitrary video divisions set by the video division setting part 2902, and issues a decimated video signal 2912. In the example in FIG. 30, the video division setting part 2902 sets seven video division frame positions, so that six (R1 to R6) video divisions are set. The frame-decimating part 2901 decimates R3 and R5 out of these six video divisions, and issues four outputs R1, R2, R4, R6.

Figure 31:
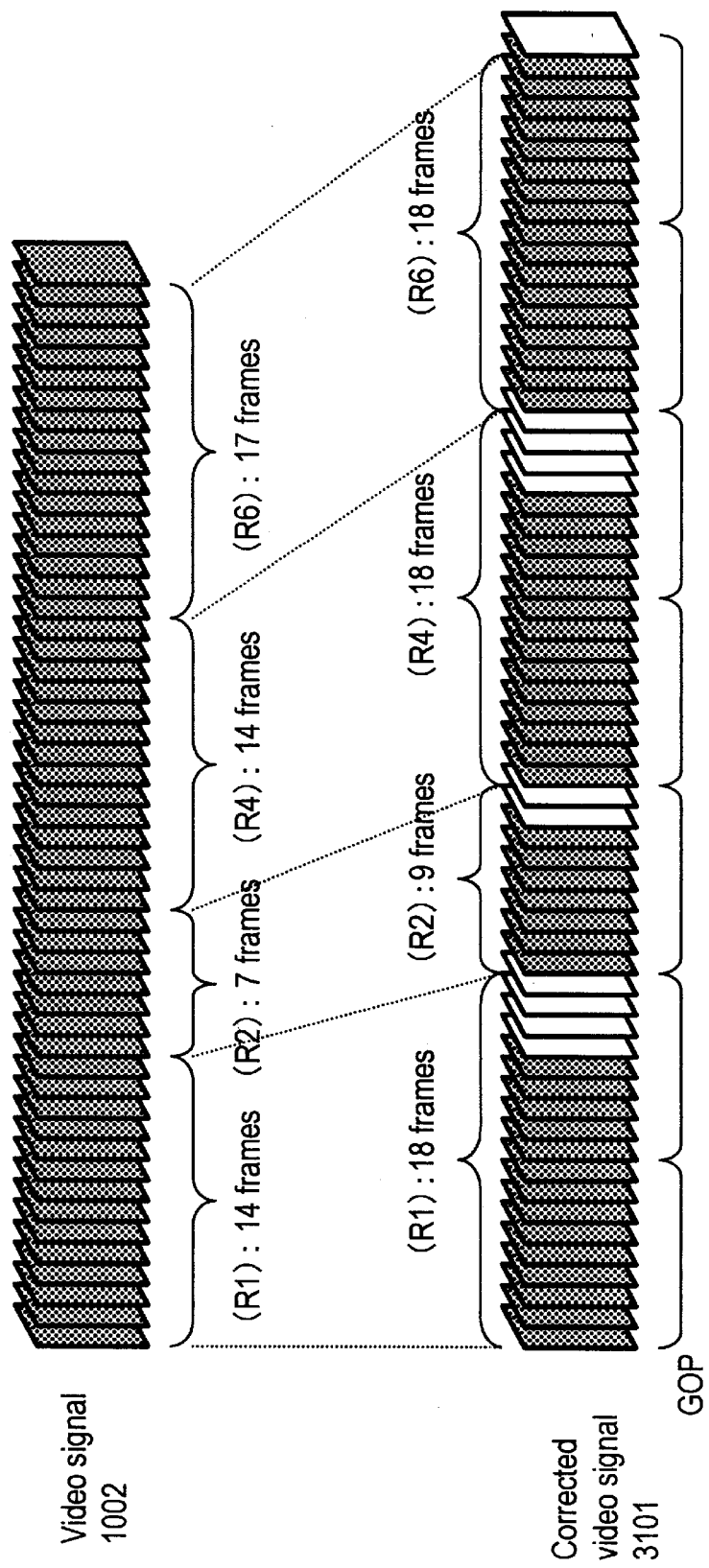
FIG. 31 is an explanatory diagram showing the motion of the GOP length adjuster in the ninth embodiment of the invention.

The GOP length adjuster 2903 adjusts, as shown in FIG. 31, the number of frames in the video division of the decimated video signal 2912, prior to coding of video signal 2912 decimated in the video division unit by the picture coder 2911, in the video division unit from the division frame position information set by the video division setting part 2902 and the video division decimating information in the frame-decimating part 2901.

In FIG. 31, the number of frames in the GOP set by the video coder 2911 is 9. Herein, the GOP length adjuster 2903 rounds off in the video division unit, so that the number of frames in the video division may be a multiple of 9. In the rounding process, when the remainder of the number of frames in the video division divided by 9 is 4 or less, excessive frames are cut off (decimated), and when 5 or more, frame pictures of the same picture as the preceding frame picture are added until the number of frames becomes a multiple of 9.

In this way, the number of frames in all video divisions becomes a multiple of the number of frames in the GOP, and when combined with the third embodiment, in the case of synthesizing plural moving picture code strings for synthesis, it is possible to synthesize by sorting each moving picture code string for synthesis randomly in video division units.

In the foregoing explanation, the GOP length adjuster 2903 rounds off, but all excessive frames may be always discarded so that the number of frames in the video division may be a multiple of the number of frames in the GOP. Similarly, the skip frame may be also added so as to be a multiple of the number of frames in the GOP.

Tenth Embodiment

A moving picture synthesizing device in a tenth embodiment of the invention is described below. In this embodiment, the frame-decimating part 2901 in the ninth embodiment shown in FIG. 29 is executed in a different mode.

The frame-decimating part 2901 in this embodiment issues only video signal of a specific number of frames to each video division set by the video division setting part 2902, and does not issue video signal for the frames of other than this specific number of frames.

Figure 32:
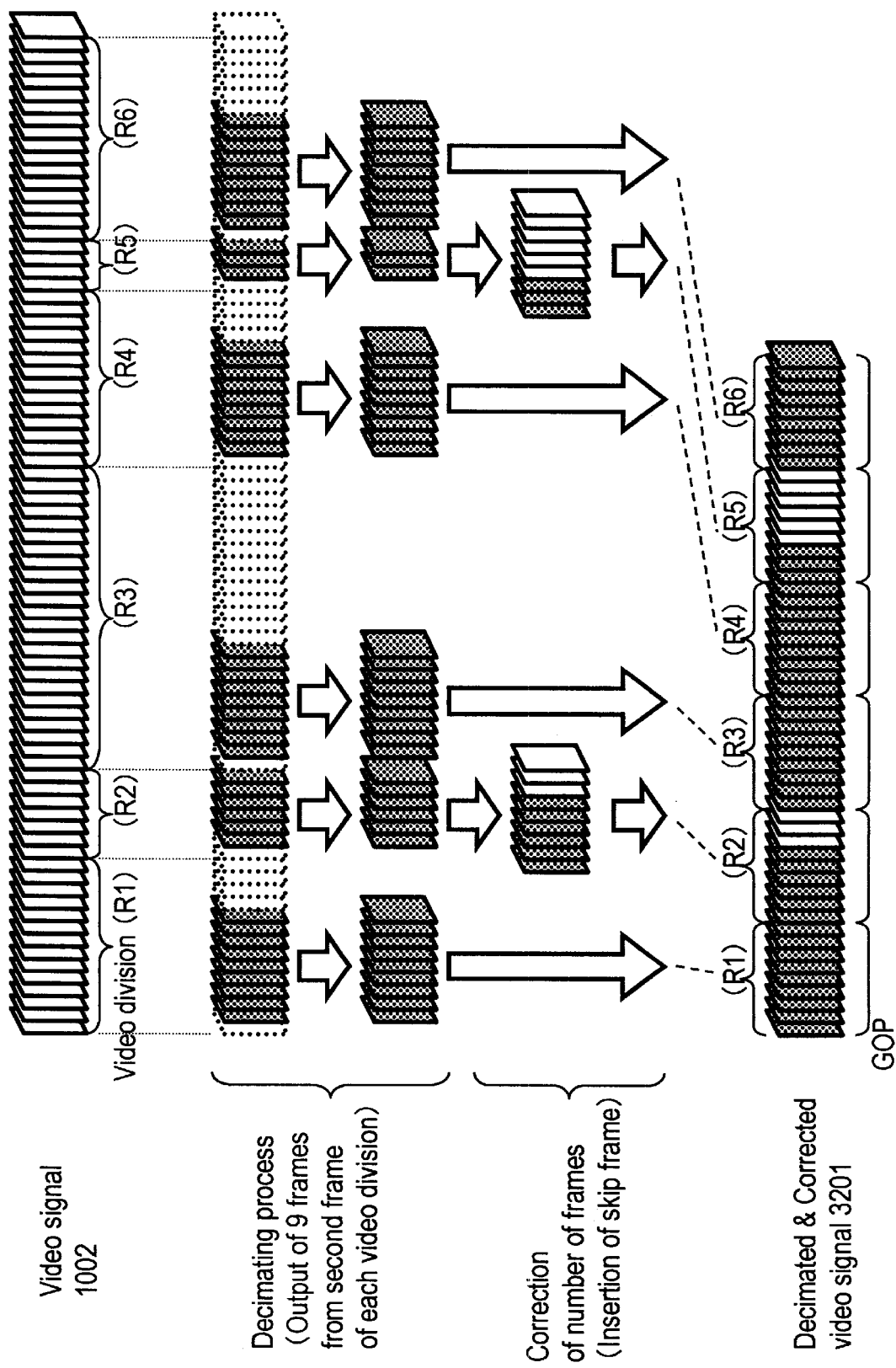
FIG. 32 is an explanatory diagram showing the frame-decimating motion in a tenth embodiment of the invention.

FIG. 32 shows an example of frame-decimating action by the frame-decimating part 2902 in this embodiment. In the example in FIG. 32, the frame-decimating part 2901 issues only a specific number of frames (9 frames) from the second frame in each video division, and discards the video signal in other range. When the number of frames after decimating is less than 9, the GOP length adjuster 2902 inserts skip frame picture code strings so that the number of frames may be 9.

Eleventh Embodiment

A moving picture synthesizing device in an eleventh embodiment of the invention is described below. The moving picture synthesizing device of the embodiment is similar to the first embodiment shown in FIG. 1, and is further expanded in the function of the code string take-out part 105.

That is, the code string take-out part 105 of the embodiment selects and takes out the frame picture code string of specific frame type out of the GOP of each moving picture code string for synthesis.

Figure 33:
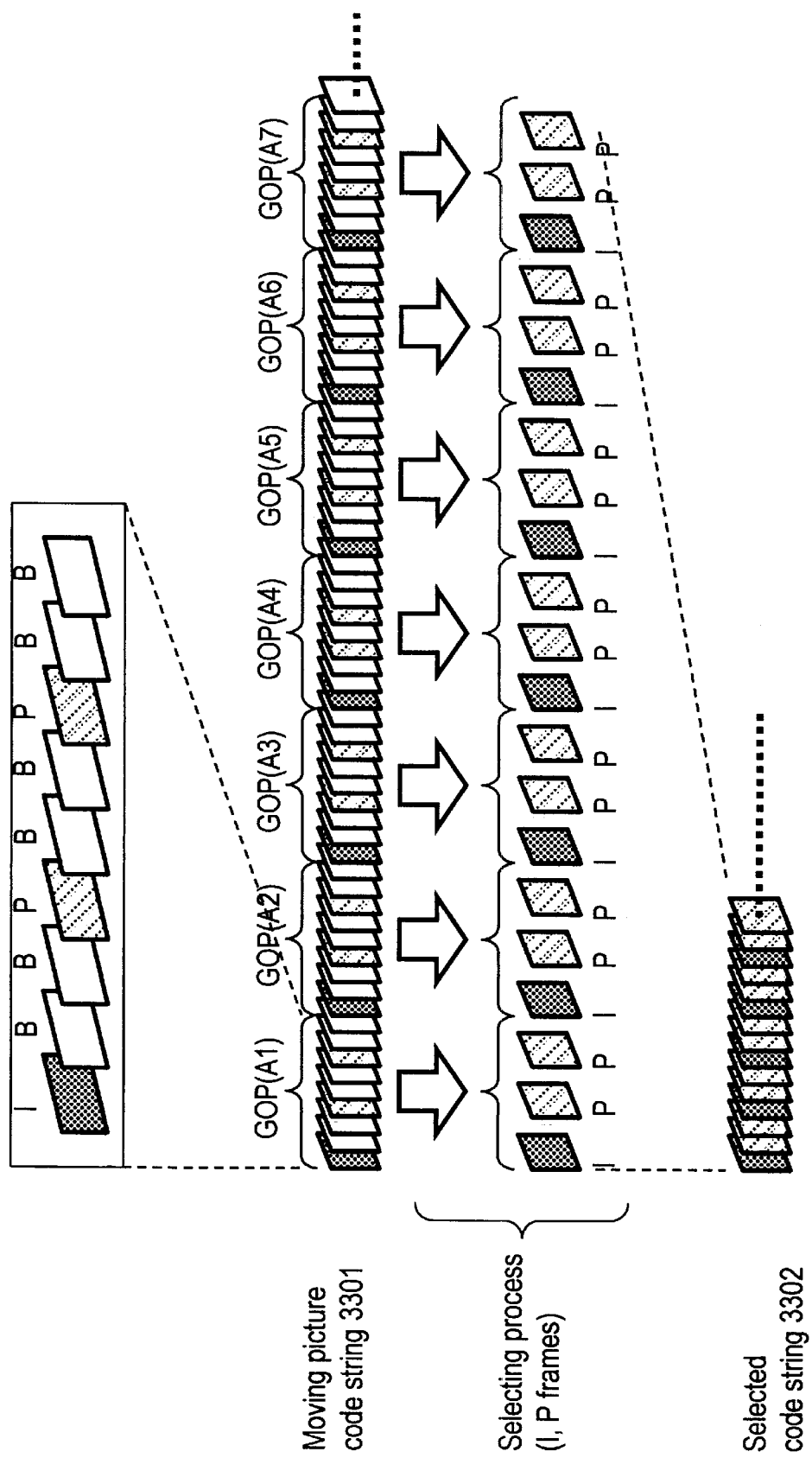
FIG. 33 is an explanatory diagram showing the frame selecting motion in an eleventh embodiment of the invention.

FIG. 33 shows the operation of the code string take-out part 105 expanded in function in this embodiment. In this embodiment, the moving picture code strings for synthesis is supposed to have a frame type pattern as shown in FIG. 13. That is, the GOP is composed of nine frames:

IBBPBBPBB.

The code string take-out part 105 expanded in function selects and takes out I picture frame and P picture frame. Thus, the code string of which frame type pattern is a repetition of

IPP is generated.

A set of three frames is interpreted as a new GOP, and synthesized, so that a synthesized picture code string composed of only two frame types, that is, I picture frame and P picture frame, is obtained. When decoding the moving picture code string, since B picture is not included, the constitution of the coding device connected to this device can be simplified.

In this embodiment, only the frame picture code string of the frame selected and taked out is synthesized, and therefore when the issued synthesized moving picture code string only is decoded, played back and displayed, the playback speed is three times that of the original input video signal (the number of frames is ⅓ because IBBPBBPBB is changed to IPP). Therefore, when combining with the fourth embodiment shown in FIG. 15, it is possible to generate the synthesized moving picture code string capable of playing at the same speed as the original input video signal.

Twelfth Embodiment

A moving picture synthesizing device in a twelfth embodiment of the invention is described below. The moving picture synthesizing device of the embodiment is similar to the second embodiment shown in FIG. 10, and is further expanded in the function of the code string take-out part 105 in other mode than in the eleventh embodiment.

The code string take-out part 105 of the embodiment has a frame type converting function for converting the frame type of an arbitrary frame position in the moving picture code string for synthesis into other frame type.

In this embodiment, in particular, the picture coder 1001 issues by giving the type of the motion prediction (forward prediction, backward prediction, etc.) and block type such as intra-code or not as its attribute in each picture region when dividing the picture of the input video signal by the unit of DCT block, macroblock or GOB, and compressing and coding.

Figure 34:
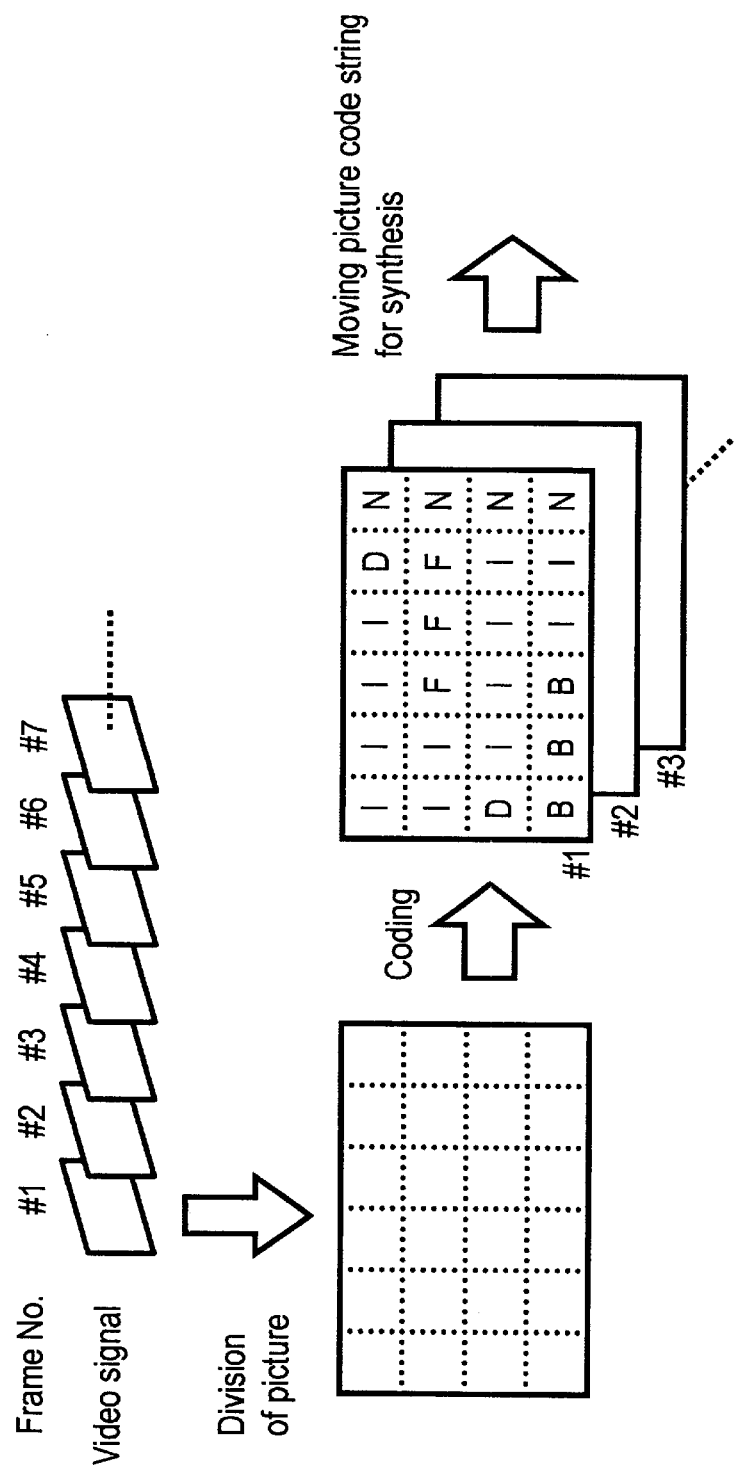
FIG. 34 is an explanatory diagram showing the picture coding motion in a twelfth embodiment of the invention.

As shown in FIG. 34, first, the picture coder 1001 divides each frame picture of the video signal entered from outside into a total of 24 picture regions (blocks) consisting of 6 lateral and 4 vertical blocks. Consequently, the picture coder 1001 codes in every block after dividing into picture regions in the frame units.

Each block is coded in a form conforming to each block type of non-compression block which is not compressed and coded (N-type), intra-compression block which is coded by intra-compression (I-type), forward prediction block which is compressed and coded by forward frame prediction (F-type), backward prediction block which is compressed and coded by backward frame prediction (B-type), and bidirectional prediction block which is compressed and coded by forward and backward bidirectional frame prediction (D-type). The block type is issued as being added in the moving picture code string for synthesis so as to be distinguished when decoding.

The frame type converting function of the code string take-out mans 105 of the embodiment is described below. Herein, an example of MPEG-1 is presented.

In MPEG-1, there are three frame types, I, P and B. The frame picture code string having each frame type is composed of the block having the following block types (as called macroblocks in the MPEG).

I picture frame: Intra-compression blockonly.

P picture frame: Intra-compression block or forward prediction block.

B picture frame: Intra-compression block, forward prediction block; or backward prediction block or bidirectional prediction block.

Therefore, to convert the frame picture code string of which frame type is I picture frame into P picture frame, the intra-compression block data of I picture frame is converted into intra-compression block of P picture frame by changing the attribute information, and it is hence not necessary to decode the coding data in the block. Similarly, the I picture frame can be converted into B picture frame.

To convert the frame picture code string of which frame type is P picture frame into I picture frame, the attribute information is changed as for the intra-compression block, and only the forward prediction block is decoded as for the forward prediction block, and the decoded data is re-coded into intra-compression block.

To convert from P picture frame into B picture frame, the attribute information is changed in both intra-compression block and forward prediction block.

To convert the frame picture code string of which frame type is B picture frame into I picture frame, the attribute information is changed in the intra-compression block, and in other prediction blocks, the prediction block is decoded, and the decoded data is re-coded into intra-compression block.

When converting from the B picture frame into P picture frame, in both intra-compression block and forward prediction block, the attribute information is changed. In backward prediction block and bidirectional prediction block, the prediction block is decoded, and, after decoding, re-coded into intra-compression block.

In this constitution, it is possible to synthesize by minimizing the picture quality deterioration by decoding even from an arbitrary frame position other than the GOP unit. Further, in the frame type converting action, by conversion control in the block unit, useless conversion process can be avoided. In picture synthesis, moreover, it is possible to synthesize in the block unit.

Moreover, since types of individual frames can be changed over, pictures of various frame patterns can be synthesized without being restricted by the frame pattern to be taken in.

Thirteenth Embodiment

A moving picture synthesizing device in a thirteenth embodiment of the invention is described below. The moving picture synthesizing device of the embodiment is similar to the first embodiment shown in FIG. 1, and is further expanded in the function of the code string take-out part 105 in other mode than in the eleventh or twelfth embodiment.

Figure 35:
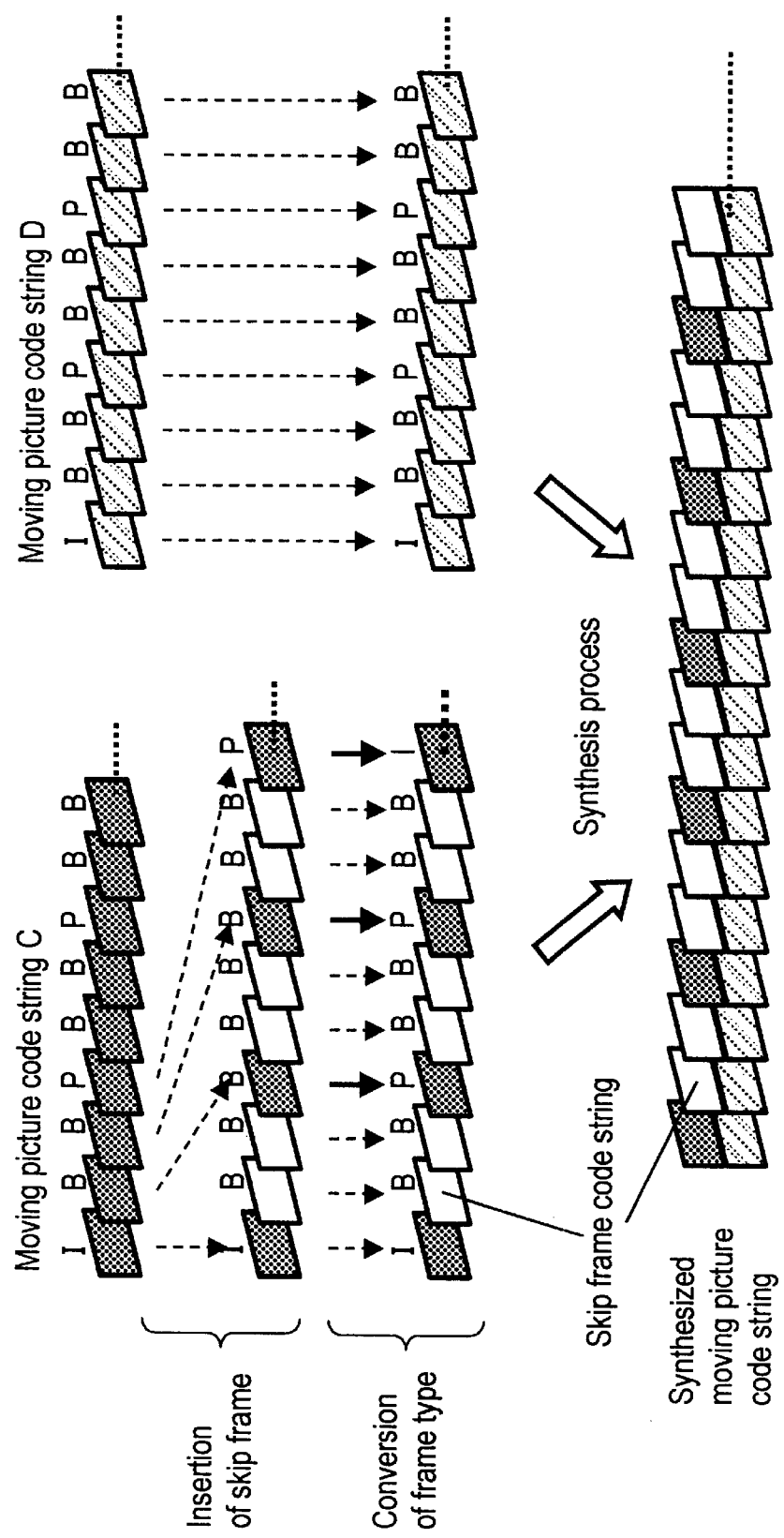
FIG. 35 is an explanatory diagram showing the synthesizing motion of moving picture code strings in a thirteenth embodiment of the invention.
Figure 36:
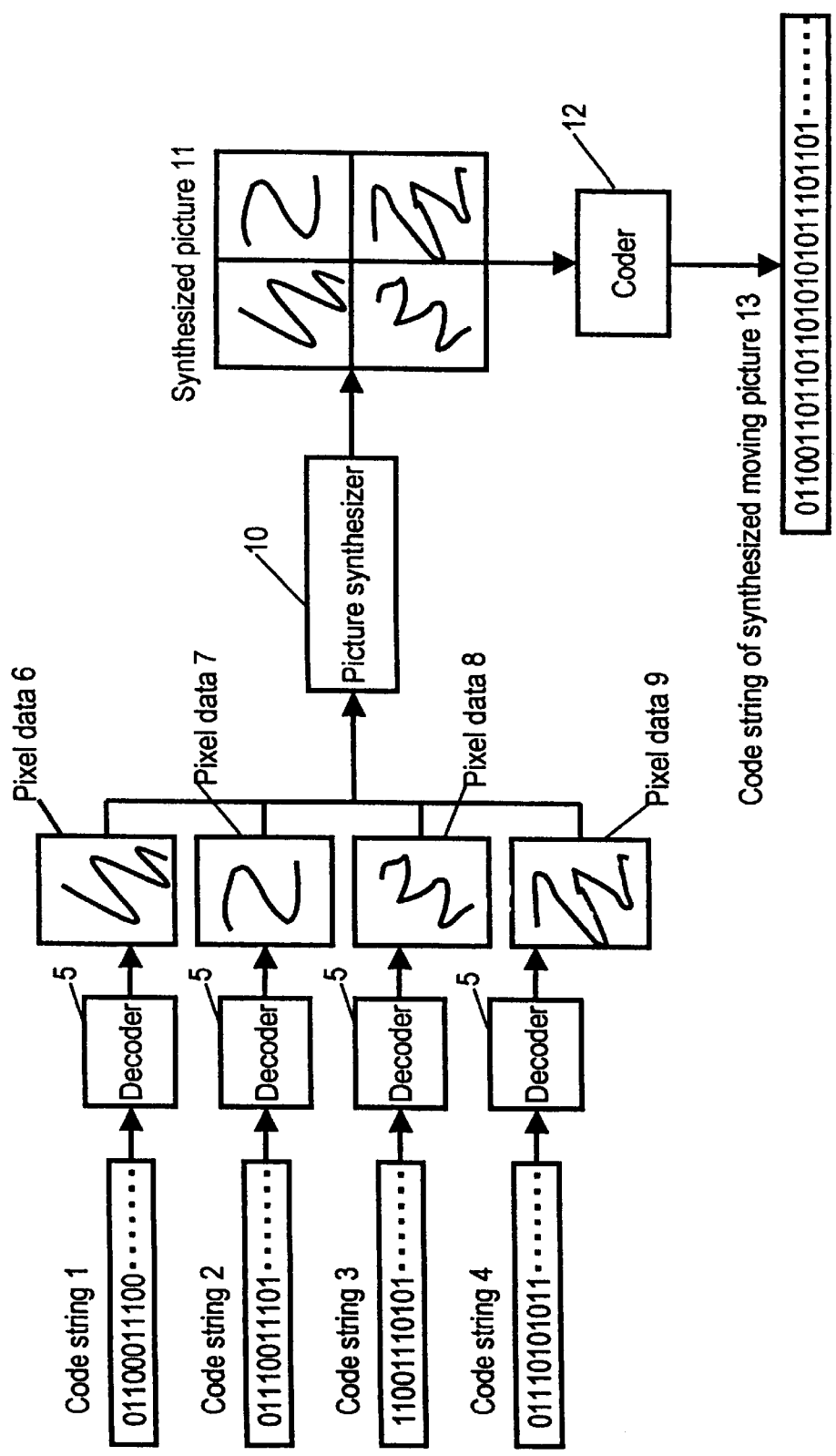
FIG. 36 is a block diagram showing a constitution of an example of a conventional moving picture synthesizing device.

An picture synthesizing action in this embodiment is shown in FIG. 35. In FIG. 35, it shows the operation for synthesizing two moving picture strings C and D having frame type patterns as shown in FIG. 13.

In this embodiment, the code string take-out part 105 expanded in function first insert an arbitrary number of skip frame picture code strings into an arbitrary moving picture code string for synthesis. This skip frame picture code string is inserted into the synthesized moving picture code string, in the fourth and fifth embodiments, and created in the same procedure as the skip frame picture code string, and is individually inserted into the moving picture code string used for synthesis.

In FIG. 35, in the moving picture code string for synthesis A, skip frame picture code strings for two frames are inserted into the frame picture code string of one frame. When inserting this skip frame code string, the frame type of the skip frame picture code string is inserted according to the frame type pattern in the GOP as shown in FIG. 13.

Consequently, by insertion of the skip frame picture code string, the frame type in the original moving picture code string for synthesis does not conform to the frame type pattern in the GOP, and the frame type of this frame picture code string is changed. Finally, the moving picture code strings for synthesis,C and D are synthesized in the frame unit, and a synthesized moving picture code string is issued.

In this constitution, in each picture region on frame picture of synthesized moving picture code string, it is possible to generate synthesized moving picture code string as presented at different playback speed, in the corresponding portion of the moving picture code string for synthesis in which the skip frame picture code string is inserted, and the corresponding portion of the moving picture code string for synthesis in which skip frame picture code string is not inserted.

In the foregoing explanation, the playback speed is controlled by inserting skip frame picture code string independently into each moving picture code string for synthesis, but the playback speed may be also changed by discarding an arbitrary frame code string in each moving picture code string for synthesis.

So far, thirteen embodiments of the invention is explained, but the invention is not limited to these illustrated embodiments alone. It may be realized in various formed not departing from the true spirit of the invention, including free combination of principal elements of the foregoing embodiments.

What is claimed is:

1. A moving picture synthesizing device for linking plural moving picture code strings, and obtaining a synthesized moving picture code string for describing a synthesized picture composed by including each moving picture described by the plural moving picture code strings, comprising:

a picture coder for compressing and coding a video signal received by said picture coder in frame units, and providing said plural moving picture code strings for synthesis, such that a frame type occurrence pattern of each of said plural moving picture code strings is the same;

a code string analyzer for analyzing header information of each of said plural moving picture code strings, a picture information generator for generating header information of synthesized moving picture code strings for describing said synthesized picture from output of said code string analyzer, a code string rewriting part for rewriting the display position information of said plural moving picture code strings into position information in said synthesized picture, and a synthesized picture output part for synthesizing the header information generated by the picture information generator and the display position information rewritten by the code string rewriting part, and outputting said synthesized moving picture code string.

2. A moving picture synthesizing device of claim 1, further comprising:

storage for storing and controlling said plural moving picture code strings used for synthesis, code string take-out part for taking out moving picture code strings to be synthesized from the storage, a synthesizing memory for temporarily storing the code strings taken out by the code string take-out part, synthesis instructing part for instructing the configuration of moving pictures described by said plural moving picture code strings at least in said synthesized moving picture, and synthesis controller for controlling the code string take-out part, code string rewriting part and synthesized picture output part according to the instruction of the synthesis instructing part.

3. A moving picture synthesizing device of claim 2, wherein the picture coder is constituted so as to issue moving picture code strings having the GOP composition same in the number of frames and the frame type pattern, and the code string take-out part is constituted to sort and take out the corresponding moving picture code strings in an arbitrary sequence in the GOP units, thereby generating synthesized moving picture code strings from the moving picture code strings obtained by sorting the moving picture code strings.

4. A moving picture synthesizing device of claim 3, wherein the picture coder converts the compressing and coding format of the entered video signal into a compressing and coding format of moving picture code string for synthesis when the video signal entered from outside is already compressed and coded data.

5. A moving picture synthesizing device of claim 3, further comprising first frame-decimating part for decimating frames at a specific frame period in video signal entered from outside, and feeding the decimated video signal into picture coder.

6. A moving picture synthesizing device of claim 3, further comprising insert-frame generator for inserting frame picture code strings describing either one frame picture or an intermediate picture of both frame pictures of the frame pictures described by the preceding frame picture code string and succeeding frame picture code string of the specific frame at a proper frame position in said synthesized picture code strings.

7. A moving picture synthesizing device of claim 6, wherein the insert-frame generator generates and inserts the frame picture code string describing the same frame picture in the frame picture described by the preceding frame picture code string when the synthesized moving picture code string is composed of I picture frame and P picture frame.

8. A moving picture synthesizing device of claim 6, wherein the insert-frame generator generates and inserts the frame picture code string describing the intermediate picture of the frame picture described by the preceding frame picture code string and the frame picture described by the succeeding frame picture code string when the synthesized moving picture code string is composed of I picture frame and P picture frame.

9. A moving picture synthesizing device of claim 6, wherein the insert-frame generator is composed of, when the synthesized moving picture code string is composed by including B picture frame, forward direction insert-frame generator for generating and inserting the frame picture code string for describing the same frame picture as the frame picture described by the preceding frame picture code string after the I picture frame or P picture frame, and a backward direction insert-frame generator for generating and inserting the frame picture code string for describing the same frame picture as the frame picture described by the succeeding frame picture code string after the B picture frame.

10. A moving picture synthesizing device of claim 5 further comprising insert-frame generator for inserting frame picture code strings describing either one frame picture or an intermediate picture of both frame pictures of the frame pictures described by the preceding frame picture code string and succeeding frame picture code string of the specific frame at a proper frame position in said synthesized picture code strings.

11. A moving picture synthesizing device of claim 10, wherein the insert-frame generator generates and inserts the frame picture code string describing the same frame picture in the frame picture described by the preceding frame picture code string when the synthesized moving picture code string is composed of I picture frame and P picture frame.

12. A moving picture synthesizing device of claim 10, wherein the insert-frame generator generates and inserts the frame picture code string describing the intermediate frame picture of the frame picture described by the preceding frame picture code string and the frame picture described by the succeeding frame picture code string when the synthesized moving picture code string is composed of I picture frame and P picture frame.

13. A moving picture synthesizing device of claim 10, wherein the insert-frame generator is composed of, when the synthesized moving picture code string is composed by including B picture frame, forward direction insert-frame generator for generating and inserting the frame picture code string for describing the same frame picture as the frame picture described by the preceding frame picture code string after the I picture frame or P picture frame, and a backward direction insert-frame generator for generating and inserting the frame picture code string for describing the same frame picture as the frame picture described by the succeeding frame picture code string after the B picture frame.

14. A moving picture synthesizing device of claim 10, wherein the number of frames in the frame picture code string to be inserted by the insert-frame generator is equal to the number of frames decimated and removed from the video signal entered from outside by said first frame-decimating part.

15. A moving picture synthesizing device of claim 3, further comprising video division setting part for generating video divisions by setting video division frame positions at arbitrary frame positions in the video signal entered from outside, and GOP length adjuster for adjusting the video signal included within the video division so that the number of frames in the video division may be a multiple of the number of frames in the GOP.

16. A moving picture synthesizing device of claim 15, wherein the video division setting part sets automatically the video division frame position by using the video division detection algorithm by picture processing.

17. A moving picture synthesizing device of claim 15, wherein the video division setting part sets automatically the video division frame positions at specific frame intervals.

18. A moving picture synthesizing device of claim 15, wherein the GOP length adjuster removes the video signal for the portion of the frames corresponding to the remainder of dividing the number of frames in the video division by the number of frames in the GOP, from the video division, so that the number of frames in the video division may be a multiple of the number of frames in the GOP.

19. A moving picture synthesizing device of claim 15, wherein the GOP length adjuster inserts any frame picture of the preceding frame picture, or succeeding frame picture, or the intermediate picture generated from the preceding and succeeding frame pictures, into the video division, so that the number of frames in the video division may be a multiple of the number of frames in the GOP.

20. A moving picture synthesizing device of claim 15, wherein the GOP length adjuster discards the frame picture from the video division if the remainder of dividing the number of frames in the video division by the number of frames in the GOP is less than a set value, and inserts any frame picture of the preceding frame picture, or succeeding frame picture, or the intermediate picture generated from the preceding and succeeding frame pictures, into the video division, if equal to or more than the set value, so that the number of frames in the video division may be a multiple of the number of frames in the GOP.

21. A moving picture synthesizing device of any one of claims 15 to 20, further comprising second frame-decimating part for decimating and removing in the video division units set by the video division setting part, from the video signal entered from outside.

22. A moving picture synthesizing device of claim 3, further comprising video division setting part for generating video divisions by setting video division frame positions at arbitrary frame positions in the video signal entered from outside, and third frame-decimating part for issuing video signal composed of a specific number of frames in the video division, to the video division set by the video division setting part, wherein the number of frames issued from the third frame-decimating part is a multiple of the number of frames in the GOP.

23. A moving picture synthesizing device of claim 22, wherein any frame picture of the preceding frame picture, or succeeding frame picture, or the intermediate picture generated from the preceding and succeeding frame pictures is inserted into the video division set by the video division setting part to fill up the shortage if the number of frames in the video division is less than the number of frames in the GOP.

24. A moving picture synthesizing device of claim 3, wherein the code string take-out part is constituted so as to select and take out the I picture frame, or I picture frame and P picture frame, from each moving picture code string, when taking out the moving picture code strings to be synthesized.

25. A moving picture synthesizing device of claim 24, further comprising insert-frame generator for inserting either frame picture of the frame pictures described by the preceding frame picture code string and the succeeding frame picture code string of the frame, or the frame picture code string describing the intermediate picture of the both frame pictures, at a proper position of the synthesized picture code strings.

26. A moving picture synthesizing device of claim 25, wherein the insert-frame generator generates and inserts the frame picture code string describing the frame picture same as the frame picture described by the preceding frame picture code string.

27. A moving picture synthesizing device of claim 25, wherein the insert-frame generator generates and inserts the frame picture code string describing the intermediate frame picture of the frame picture described by the preceding frame picture code string and the frame picture described by the succeeding frame picture code string.

28. A moving picture synthesizing device of claim 25, wherein the number of frames of the frame picture code string inserted by the insert-frame generator is equal to the number of frames decimated when selecting and taking out the I picture frame, or I picture frame and P picture frame, from each moving picture code string to be synthesized by the code string take-out part.

29. A moving picture synthesizing device of claim 3, wherein the picture coder divides the each frame picture of the video signal entered from outside into plural blocks, compresses and codes in the block units, and issues the block type information as the type of compressing and coding of the block, and further comprises frame type converter for converting the frame type at an arbitrary position of the moving picture code string for synthesis to be synthesized into other frame type, by converting the block type in the frame picture code string in the block unit from the block type information.

30. A moving picture synthesizing device of claim 3, wherein the code string take-out part is constituted so as to insert the frame picture code string describing either frame picture of the frame pictures described by the preceding frame picture code string and succeeding frame picture code string of the frame or the intermediate picture of both frame pictures, at a proper frame position, in arbitrary moving picture code strings to be synthesized, and by generating a synthesized moving picture code string by synthesizing the moving picture code string in which the frame picture code string is inserted and the moving picture code string in which none is inserted, in the frame unit, the synthesized moving picture code string is generated so that the reproduction speed may be different between the insertion portion and non-insertion portion of the frame picture code string, in the picture region of the synthesized moving picture code string.

31. A moving picture synthesizing device of claim 11, wherein the number of frames in the frame picture code string to be inserted by the insert-frame generator is equal to the number of frames decimated and removed from the video signal entered from outside by said first frame-decimating part.

32. A moving picture synthesizing device of claim 11, wherein the number of frames in the frame picture code string to be inserted by the insert-frame generator is equal to the number of frames decimated and removed from the video signal entered from outside by said first frame-decimating part.

33. A moving picture synthesizing device of claim 13, wherein the number of frames in the frame picture code string to be inserted by the insert-frame generator is equal to the number of frames decimated and removed from the video signal entered from outside by said first frame-decimating part.

34. A moving picture synthesizing device of claim 26, wherein the number of frames of the frame picture code string inserted by the insert-frame generator is equal to the number of frames decimated when selecting and taking out the I picture frame, or I picture frame and P picture frame, from each moving picture code string to be synthesized by the code string take-out part.

35. A moving picture synthesizing device of claim 27, wherein the number of frames of the frame picture code string inserted by the insert-frame generator is equal to the number of frames decimated when selecting and taking out the I picture frame, or I picture frame and P picture frame, from each moving picture code string to be synthesized by the code string take-out part.

* * * * *